(12) United States Patent
Murtagh

(10) Patent No.: US 9,734,733 B2
(45) Date of Patent: Aug. 15, 2017

(54) MODELLING ASSEMBLY

(71) Applicant: MBM Building Systems Limited, Dublin (IE)

(72) Inventor: Damien Murtagh, Dublin (IE)

(73) Assignee: MBM Building Systems Limited (IE)

( * ) Notice: Subject to any disclaimer, the term of this patent is extended or adjusted under 35 U.S.C. 154(b) by 81 days.

(21) Appl. No.: 14/370,328

(22) PCT Filed: Jan. 4, 2013

(86) PCT No.: PCT/GB2013/050012
§ 371 (c)(1),
(2) Date: Jul. 2, 2014

(87) PCT Pub. No.: WO2013/102767
PCT Pub. Date: Jul. 11, 2013

(65) Prior Publication Data
US 2014/0315466 A1    Oct. 23, 2014

(30) Foreign Application Priority Data

Jan. 4, 2012 (GB) .................................. 1200038.6

(51) Int. Cl.
*A63H 33/00* (2006.01)
*G09B 25/04* (2006.01)

(52) U.S. Cl.
CPC .................................. *G09B 25/04* (2013.01)

(58) Field of Classification Search
CPC ............... E04B 1/3483; E04B 1/34807; E04B 1/34823; E04B 2/215; A63H 33/04; A63H 33/06; A63H 33/086; A63H 33/044; G09B 25/04; G01J 3/528
See application file for complete search history.

(56) References Cited

U.S. PATENT DOCUMENTS 1,935,256 A * 11/1933 Wessel ................. A63H 33/105
446/122
2,167,169 A * 7/1939 Bolhuis ................ A63H 33/044
434/72

(Continued)

FOREIGN PATENT DOCUMENTS

FR         2681170        3/1993
GB         758163         10/1956
(Continued)

OTHER PUBLICATIONS

International Search Report dated Apr. 25, 2013, from International Stage PCT Application No. PCT/GB2013/050012.

(Continued)

*Primary Examiner* — Aarti B Berdichevsky
*Assistant Examiner* — Urszula M Cegielnik
(74) *Attorney, Agent, or Firm* — Keusey & Associates, P.C.

(57) ABSTRACT

A modelling assembly 1400 includes a plurality of releasably interconnectable parts, the parts including floor parts 1402 and wall parts 1408. The assembly 1400 includes a plurality of pegs 102, each of which, in an assembled condition, extends from one part to another part to hold the parts together, at least one of the parts defining a peg receiving hole 104 in which one of the pegs 102 is receivable.

15 Claims, 35 Drawing Sheets

(56) References Cited

U.S. PATENT DOCUMENTS

| | | | | |
|---|---|---|---|---|
| 2,871,619 A * | 2/1959 | Walters | A63H 33/044 | 249/115 |
| 2,988,844 A * | 6/1961 | Frimberger | A63H 33/06 | 297/440.14 |
| 3,284,946 A * | 11/1966 | Christiansen | A63H 33/04 | 446/105 |
| 3,603,004 A * | 9/1971 | Fink | G09B 25/08 | 434/73 |
| 3,646,690 A * | 3/1972 | Feagan | G09B 25/04 | 434/73 |
| 4,192,083 A * | 3/1980 | Rebbeck | G09B 25/06 | 108/64 |
| 4,270,303 A * | 6/1981 | Xanthopoulos | A63H 33/086 | 446/110 |
| 4,306,372 A * | 12/1981 | Lin | A63H 33/044 | 446/109 |
| 4,650,437 A * | 3/1987 | Sitkus | A63H 33/08 | 434/72 |
| 5,152,710 A * | 10/1992 | Montgomery | A63H 3/52 | 206/427 |
| 5,779,517 A * | 7/1998 | Clarke | A63H 33/044 | 446/108 |
| 5,961,364 A * | 10/1999 | Bach | A63H 33/044 | 446/110 |
| 5,971,830 A * | 10/1999 | Tobin | A63D 3/00 | 273/241 |
| 6,524,107 B1 * | 2/2003 | Brown | G09B 25/04 | 434/72 |
| 6,782,119 B1 | 8/2004 | Barlett | | |
| 7,229,334 B2 * | 6/2007 | Ishikawa | A63H 33/042 | 446/110 |
| 7,581,357 B2 * | 9/2009 | Richardson | E04B 1/34321 | 446/105 |
| 7,596,473 B2 * | 9/2009 | Hansen | G06F 17/50 | 345/420 |
| 8,113,840 B2 * | 2/2012 | Kuhn | G09B 25/04 | 434/72 |
| 2001/0034183 A1 * | 10/2001 | Brownrigg | A63H 3/52 | 446/476 |
| 2002/0059756 A1 * | 5/2002 | Matsubara | E04B 1/02 | 52/79.12 |
| 2005/0241243 A1 * | 11/2005 | Wright | E01C 5/005 | 52/79.9 |
| 2006/0009121 A1 * | 1/2006 | Rotundo | A63H 3/52 | 446/476 |
| 2010/0186322 A1 | 7/2010 | Libby et al. | | |

FOREIGN PATENT DOCUMENTS

| | | |
|---|---|---|
| WO | 0226339 | 4/2002 |
| WO | 02101690 | 12/2002 |
| WO | 2011126455 | 10/2011 |

OTHER PUBLICATIONS

Written Opinion dated Apr. 25, 2013, from International Stage PCT Application No. PCT/GB2013/050012.
Examination Report dated Dec. 2, 2016 from corresponding EPA 13 703 458.3.

* cited by examiner

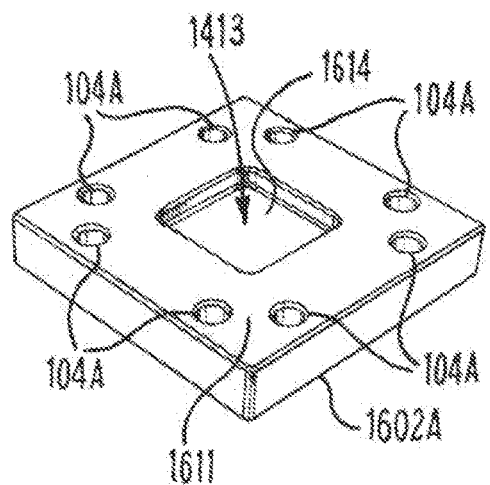
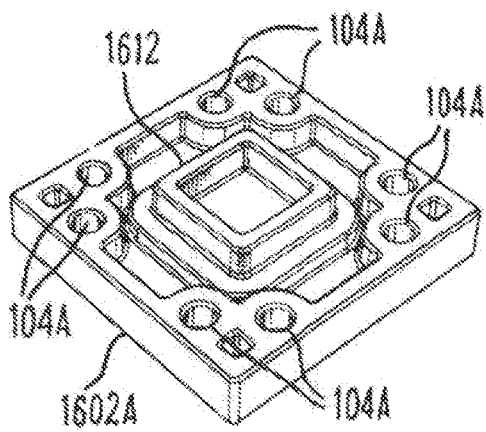
Fig. 37A  Fig. 37B
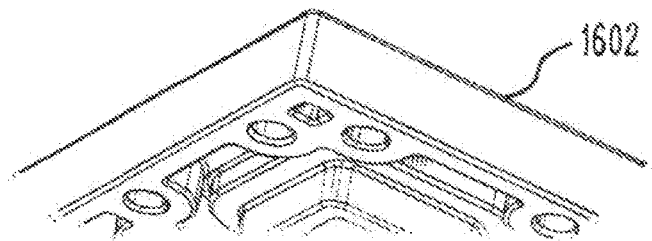
Fig. 38
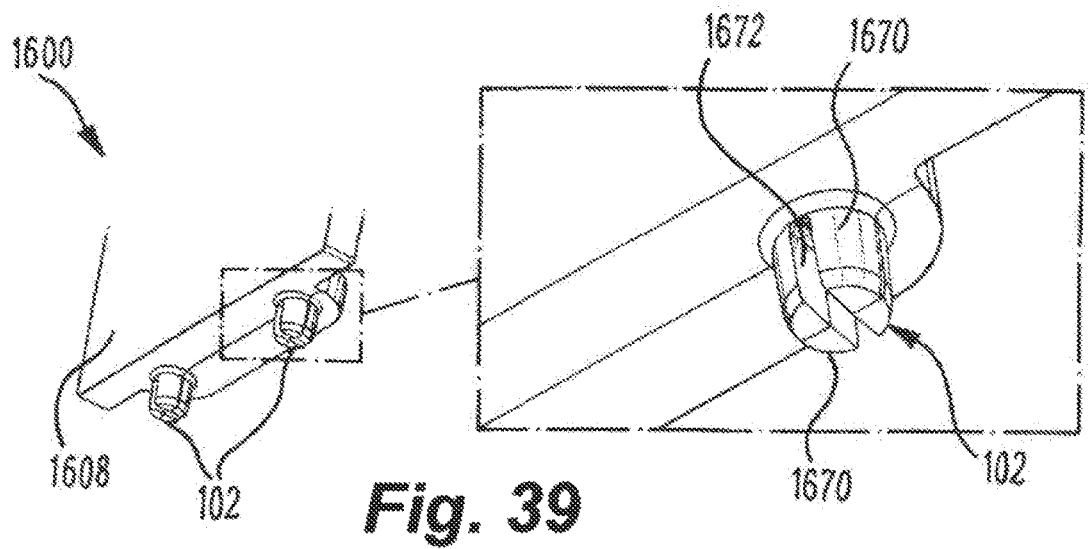
Fig. 39

MODELLING ASSEMBLY

This invention relates to a modelling assembly. In particular the invention relates to an assembly of modelling parts which are used to create a miniature model of a building.

Models are used by many professions to show potential clients how building work or design work will affect a building, or a room within a building. Models help the potential client to envisage how the outcome of the work will look, and, the models can assist the client in making a decision as to whether they wish to proceed with carrying out the work. Models are also very useful for architects, tradesmen and other such professionals as the models allow them to present their vision of how a building should be created or how a room would look if re-designed in a particular manner.

Many professionals use bespoke models. However, bespoke models must be created in their entirety on each occasion and consequently can be relatively time consuming expensive to produce. In many cases, a project will go through a number of redesigns before the client is happy to proceed with carrying out the work. Using bespoke modelling techniques, each redesign will have to be modelled as a new bespoke model. For the most part, previous models are likely to be discarded resulting in a relatively large modelling materials cost and a lot of time spent on creating the bespoke models.

According to the present invention, there is provided a modelling assembly, the assembly including a plurality of releasably interconnectable parts, the parts including floor parts and wall parts, the assembly including a plurality of pegs, each of which, in an assembled condition, extends from one part to another part to hold the parts together, at least one of the parts defining a peg receiving hole in which one of the pegs is receivable.

Possibly, the pegs are formed integrally with one or some of the parts. Alternatively, the pegs may be provided separately to the parts.

Possibly, the hole is a through hole so that the peg is receivable in one end of the hole or the other. Possibly, each peg is resiliently compressible to grip when in the hole.

Possibly, each peg defines a slot dividing the peg into two peg parts.

Possibly, the assembly includes a floor sub-assembly, which may include a plurality of the floor parts. The floor sub-assembly may include link parts. In the assembled condition, the floor parts may be held together by the link parts. Possibly, the link parts include integrally formed pegs.

Possibly, the floor parts define floor part peg receiving holes, which may be through holes, and which may receive the link part pegs, and may receive the link part pegs in use from above and/or below.

Possibly, the assembly includes a plurality of different floor parts, which may be modular, possibly based on a module which may be square in plan, and may comprise spaced pairs of floor part peg receiving holes, one pair of holes being arranged along each side of the module. The holes may be provided at a spacing of one half module length between the holes of a pair, with each hole spaced a quarter module length from the nearest module corner.

Each floor part may have an in use upper surface which includes a receiving formation.

The floor parts may be in the form of strips, comprising one, two, three or more modules, wherein the modules may be arranged in a line.

Each wall part may include integral formed pegs, which may be arranged in pairs. One or more pegs, and more preferably, a pair of spaced pegs, may project from each end of the wall part, which ends may be similar in form.

The wall part pegs may correspond to, and may be receivable in the floor part peg receiving holes.

The wall parts may be substantially the same width (ie the in use horizontal dimension) as the length of each side of the module.

The floor parts may be locatable above the wall parts to form ceiling parts, wherein the wall part pegs are receivable in the floor part peg receiving holes from below.

The wall parts may be formed of a transparent or translucent material, and/or may include transparent or translucent parts.

The wall parts may include parts which have one edge which is chamfered to permit the formation of angles or corners, and may be chamfered to permit a 90° corner to be formed with a like wall part.

The assembly may include floor covering panels, which may correspond in plan size with the size and shape of the module. Each floor covering panel may include integral pegs which correspond with the floor part peg receiving holes. Alternatively, each floor covering panel may include a retaining formation which is engagable with the receiving formation.

The assembly may comprise a plurality of layers, which may be arranged one on top of the other. Each layer may comprise an upper and lower floor sub-assembly, wherein the lower floor sub-assembly of a higher layer forms the upper floor sub-assembly of an adjacent lower layer.

The assembly may include roof covering panels for locating on the uppermost upper floor sub-assembly, each of which may correspond in plan size with the size and shape of one module. Each roof covering panel may include integral pegs which correspond with the floor part peg receiving holes. Alternatively, each roof covering panel may include a retaining formation which is engagable with the receiving formation.

The assembly may include internal and external wall coverings, which may be mounted respectively to internal and external surfaces of at least some of the parts.

The assembly may include a pitched roof sub-assembly. The pitched roof sub-assembly may include truss parts, each of which may be in the form of a parallelogram, having a pair of parallel upper and lower sides and a pair of angled sides, one of the angled sides forming an outwardly facing surface in the assembled condition. Each truss part may include pegs or holes formed on the upper and lower sides and the outwardly facing surface.

Possibly, the pitched roof sub-assembly includes a truss sub-assembly, which may include a plurality of the truss parts, and may include a truss apex part. The truss apex part may include pegs or holes on outer and base sides.

Possibly, the pitched roof sub-assembly includes a pair of spaced truss sub-assemblies, and may include span members, which may extend between the truss sub-assemblies, and may include pegs or holes which, in the assembled condition, may engage the pegs or holes formed on the outwardly facing surfaces of the truss parts and the outer sides of the truss apex part.

Possibly, the pitched roof sub-assembly includes gable end parts, which include pegs or holes for mounting the gable end parts to the side of one of the truss sub-assemblies.

The assembly may include frame parts, which may define holes, slots or channels in which the pegs are receivable, which may be elongate, and in which the pegs may be receivable from a plurality of directions, and may be receivable along the length of the slot or channel, and/or transverse to the length of the slot or channel.

The assembly may include a structure, which may comprise a plurality of frame parts.

The assembly may include one or more external wall parts and/or interior wall parts, which may be mountable to the structure.

The assembly may include mountings for mounting the external or interior wall parts to the structure. The mountings may include magnetic members, which may be in the form of strips, which may comprise parts of the structure, or parts of the external or interior wall panels. Possibly, the structure frame parts or the external and interior wall parts are formed of or include complementary magnetic or magnetically attractable material respectively to suit.

The external wall parts and/or the interior wall parts may define window and/or door apertures. The assembly may comprise aperture frame parts which extend across spacing between the external wall parts and the corresponding interior wall parts.

The external wall parts may continue upwardly beyond an uppermost height of the structure.

The structure may be in the form of a box shape comprising a floor part, four corner uprights and an upper cross beam between adjacent uprights.

The structure may include double cross beams between adjacent uprights.

In a preferred embodiment, the external wall parts and/or the interior wall parts may comprise magnetic paper.

Alternatively, the mountings may include pegs which are receivable within holes defined by the wall parts or the structure.

Possibly, the assembly is an architectural model, and may be a model of a building or structure.

Possibly, the assembly and/or the parts thereof are provided in the form of virtual entities in a computer program.

According to a second aspect of the present invention, there is provided a method of forming a modelling assembly, the method comprising the step of providing a modelling assembly, the modelling assembly including a plurality of releasably interconnectable parts including floor parts and wall parts, the modelling assembly including a plurality of pegs, each of which, in an assembled condition, extends from one part to another part to hold the parts together, at least one of the parts defining a peg receiving hole in which one of the pegs is receivable.

The modelling assembly may be as described in any of the preceding paragraphs.

According to another aspect of the present invention, there is provided a kit of parts for a modelling assembly, the kit including a modelling assembly, the modelling assembly including a plurality of releasably interconnectable parts including floor parts and wall parts, the kit including a plurality of pegs, each of which, in an assembled condition, extends from one part to another part to hold the parts together, at least one of the parts defining a peg receiving hole in which one of the pegs is receivable.

The kit may include the modelling assembly as described in any of the preceding paragraphs.

According to a further aspect of the present invention, there is provided a modelling assembly comprising a plurality of releasably interconnectable frame parts, external wall parts and interior wall parts, wherein, the plurality of frame parts are connected to form a supporting structure to mount the external wall parts and the interior wall parts, wherein, the supporting structure includes mountings to allow the supporting structure to mount the external wall parts and the interior wall parts.

The invention will be more clearly understood from the following description of some embodiments thereof, given by way of example only with reference to the accompanying drawings, in which.

Figure 29:
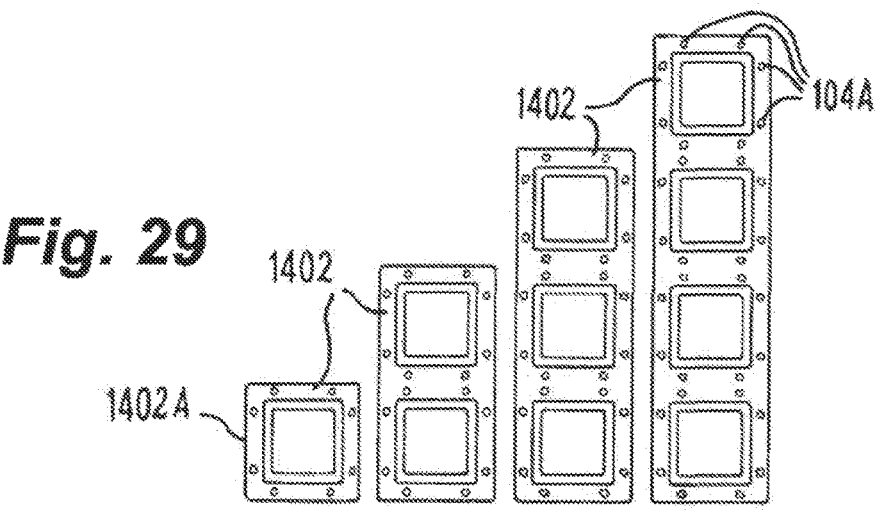
FIG. 29 is a plan view of a number of floor parts of another modelling assembly.
Figure 30:
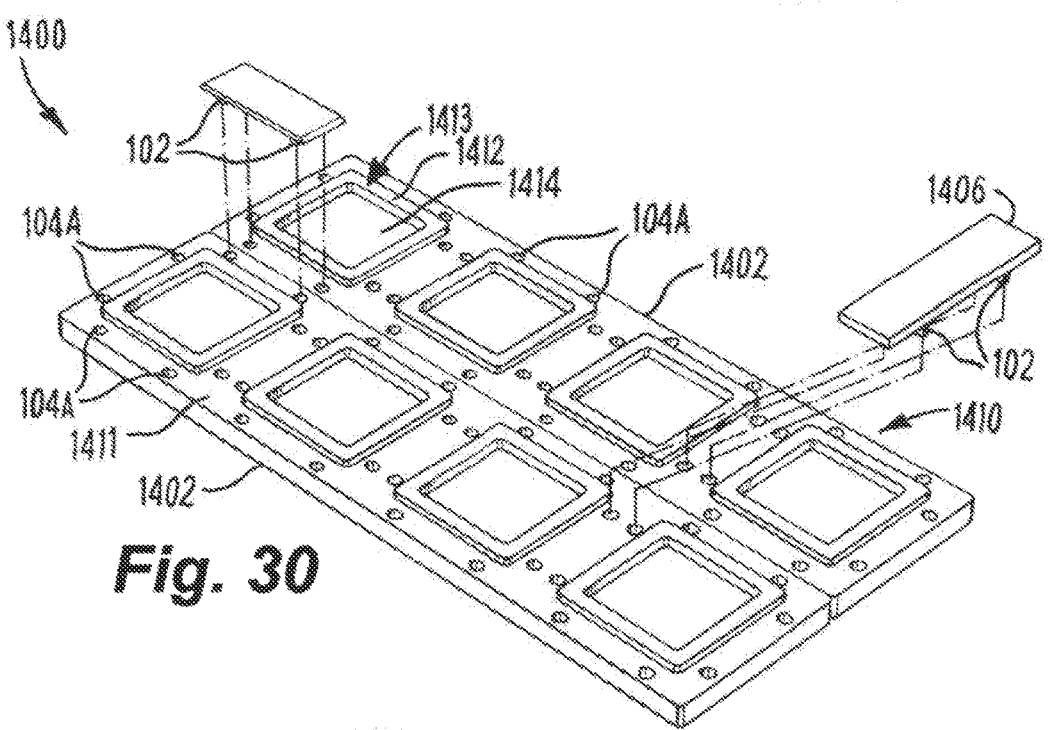
FIG. 30 is a perspective view from above of a floor sub-assembly of the assembly of FIG. 29.
Figure 31:
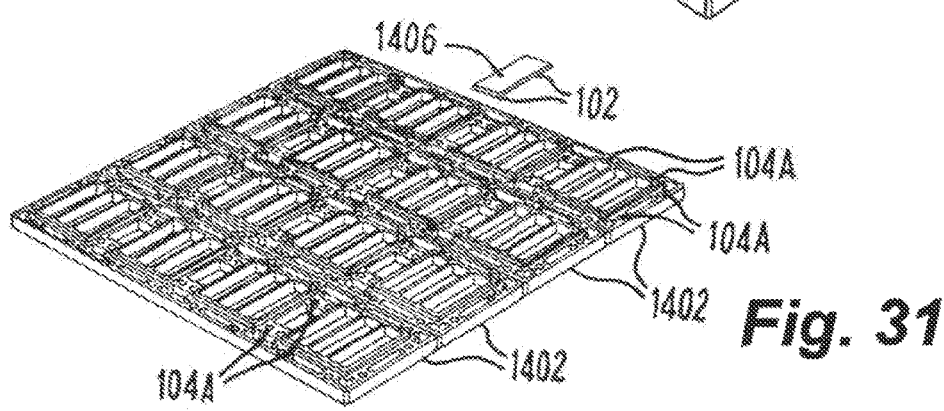
FIG. 31 is a perspective view from above of the floor sub-assembly of FIG. 30.
Figure 32A:
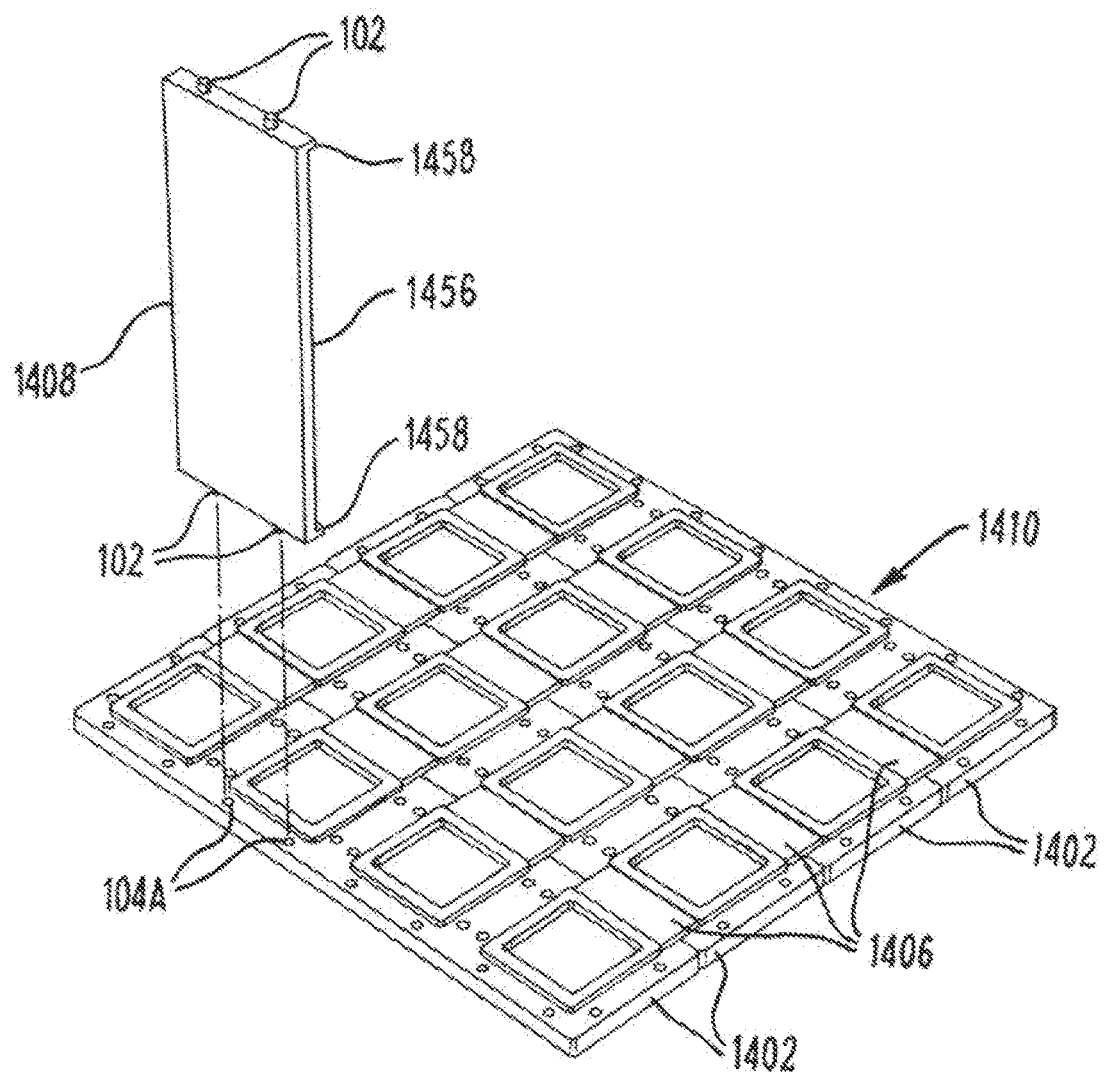
Figure 32B:
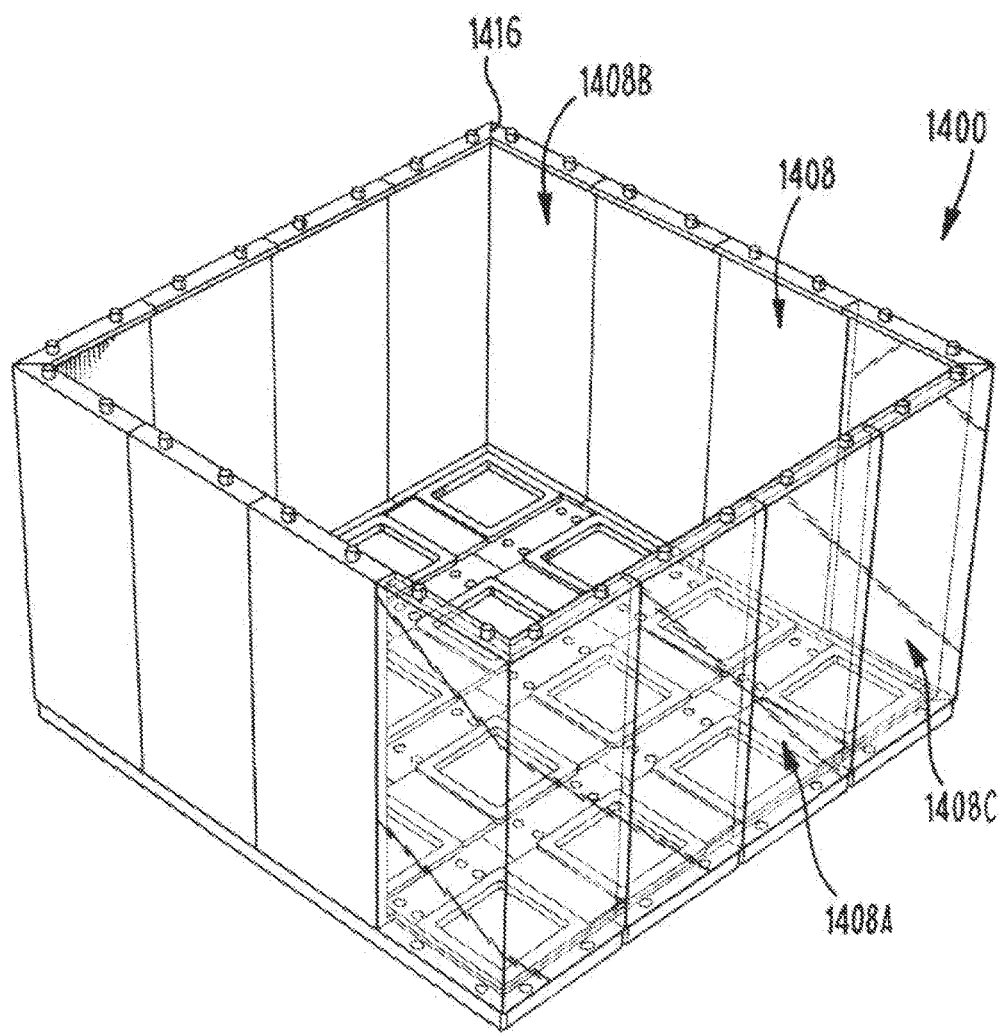
Figure 32C:
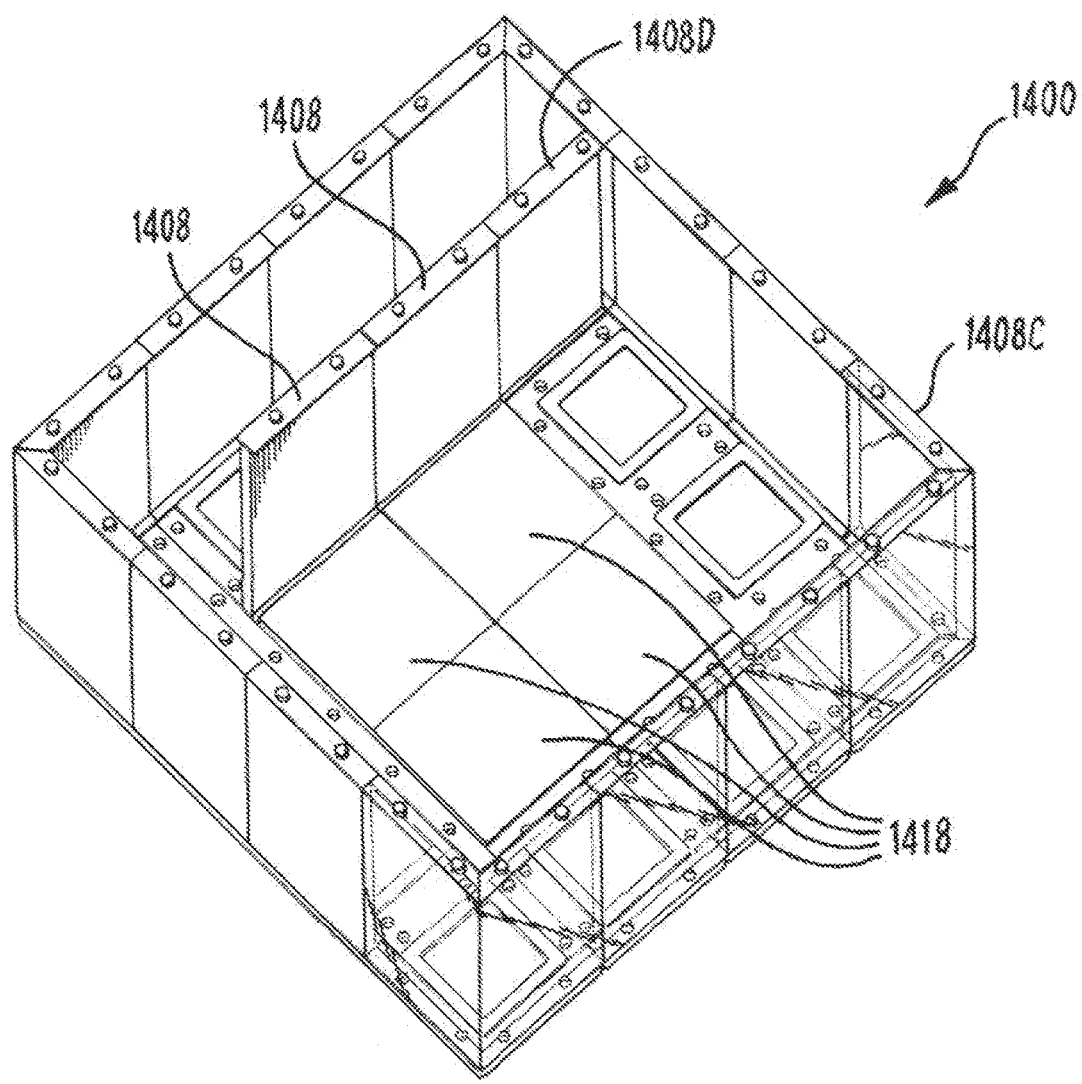
Figure 32D:
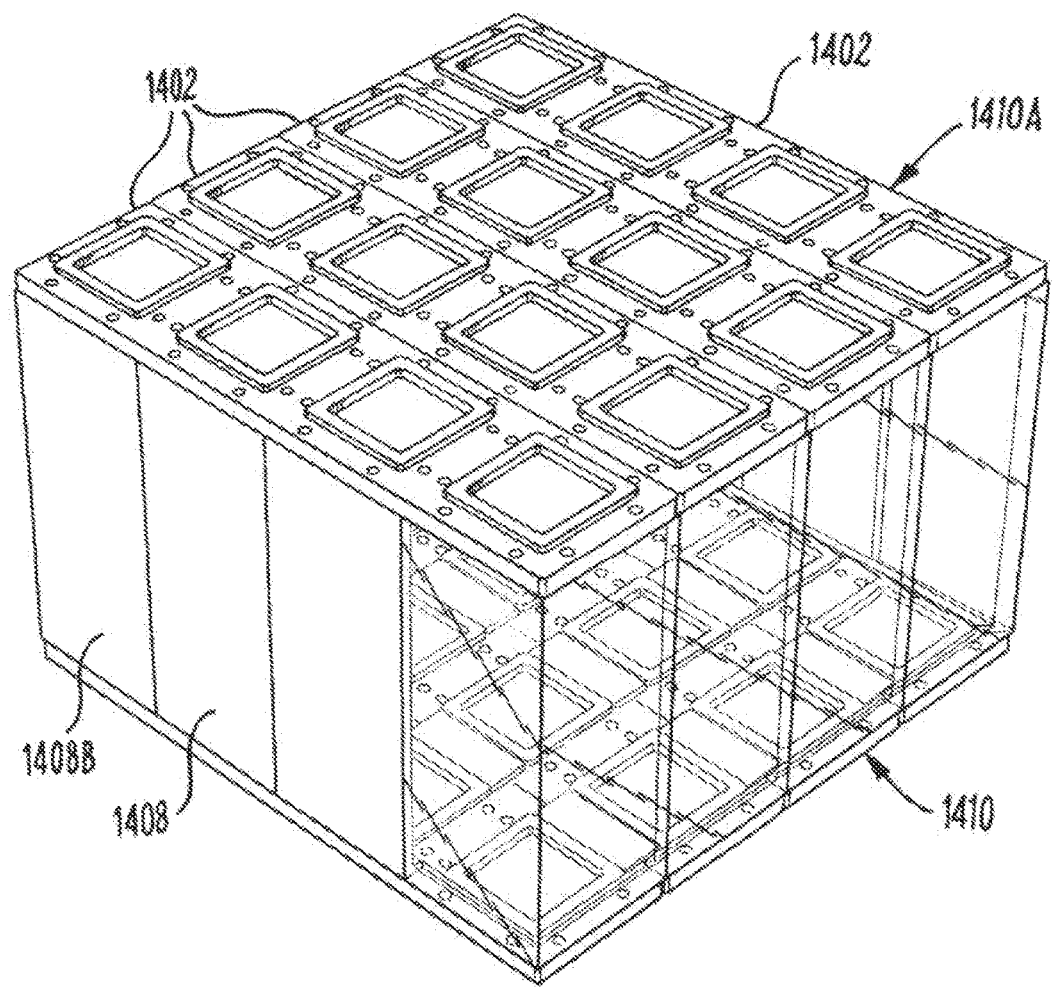
Figure 32E:
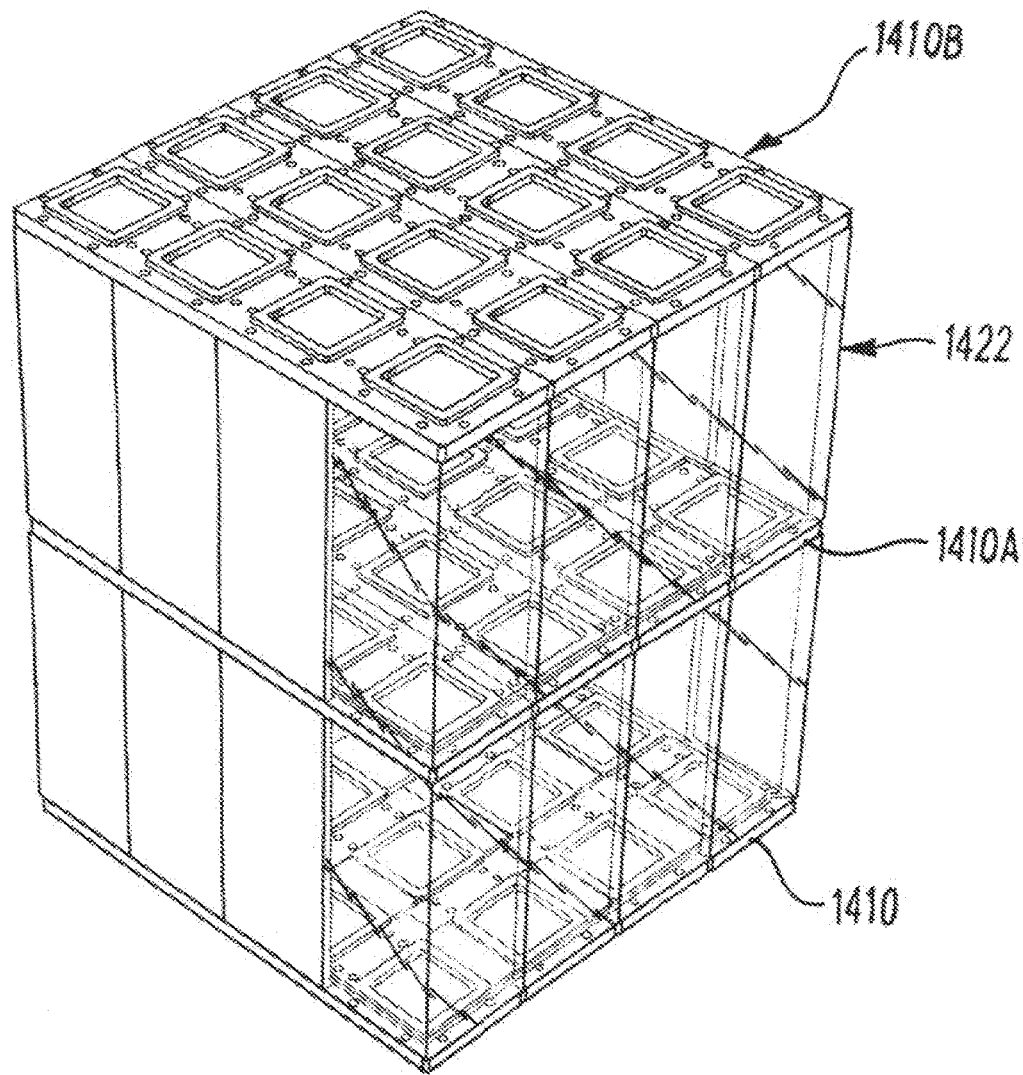
Figure 32F:
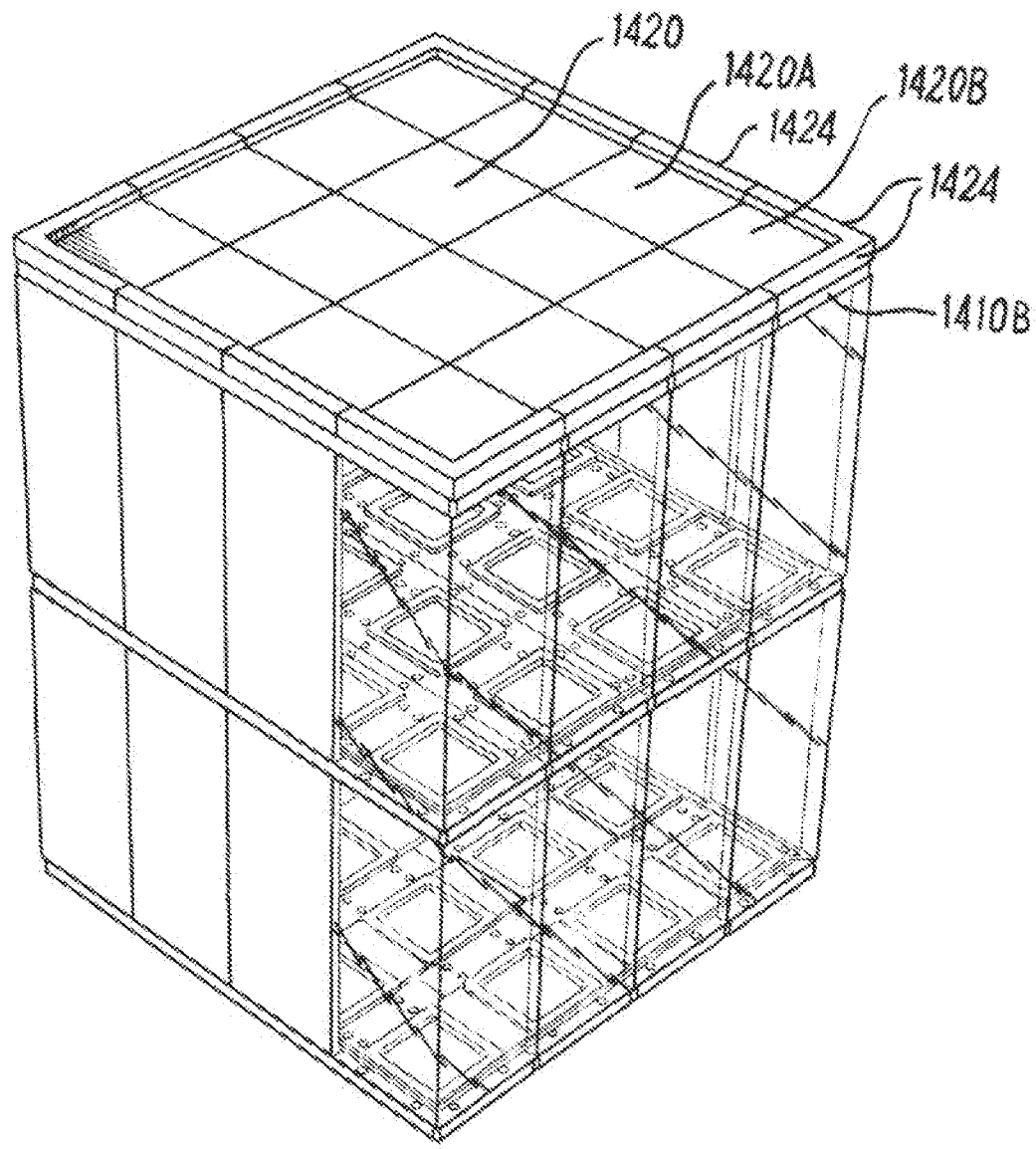
Figure 32G:
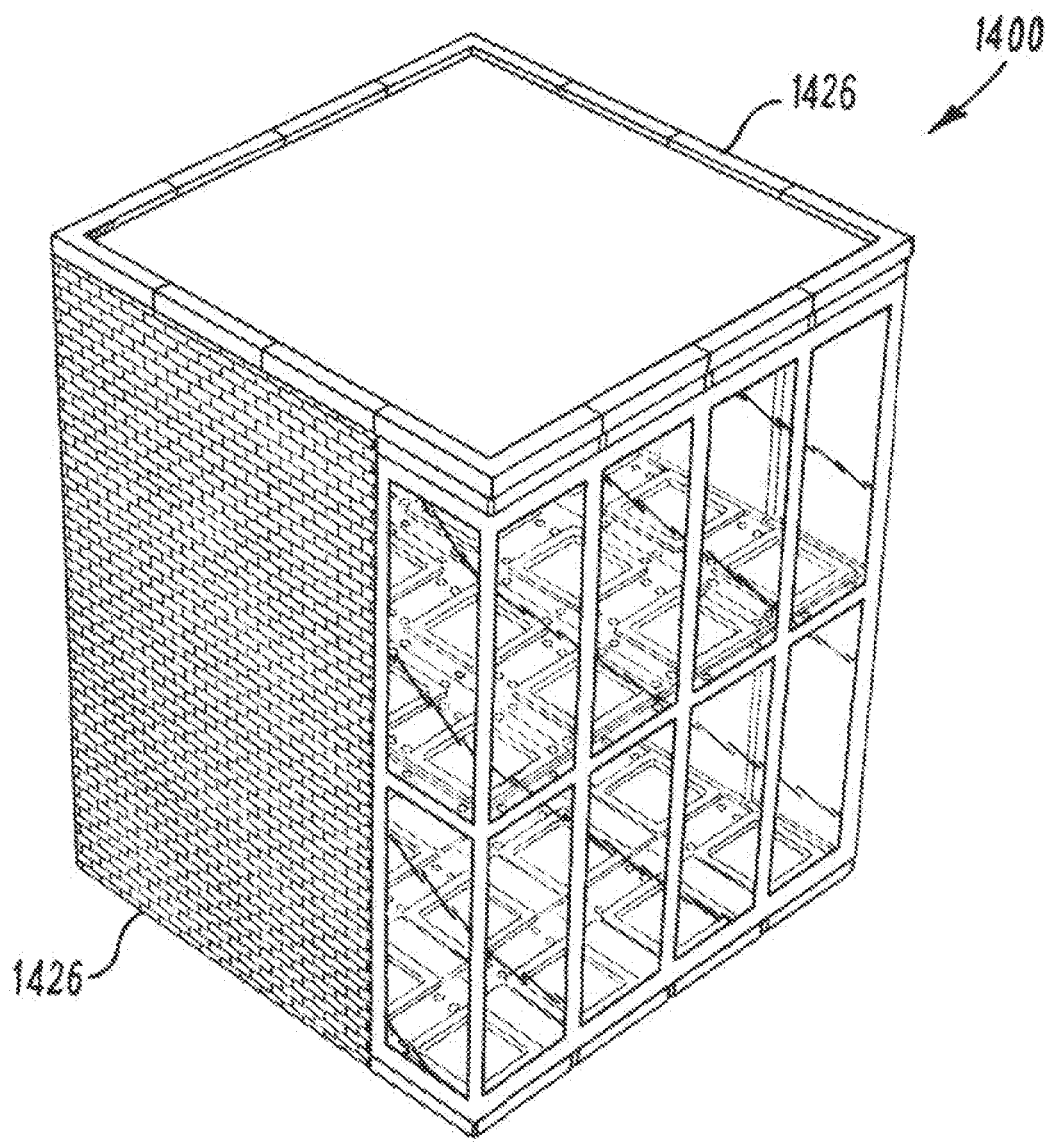
Figure 33:
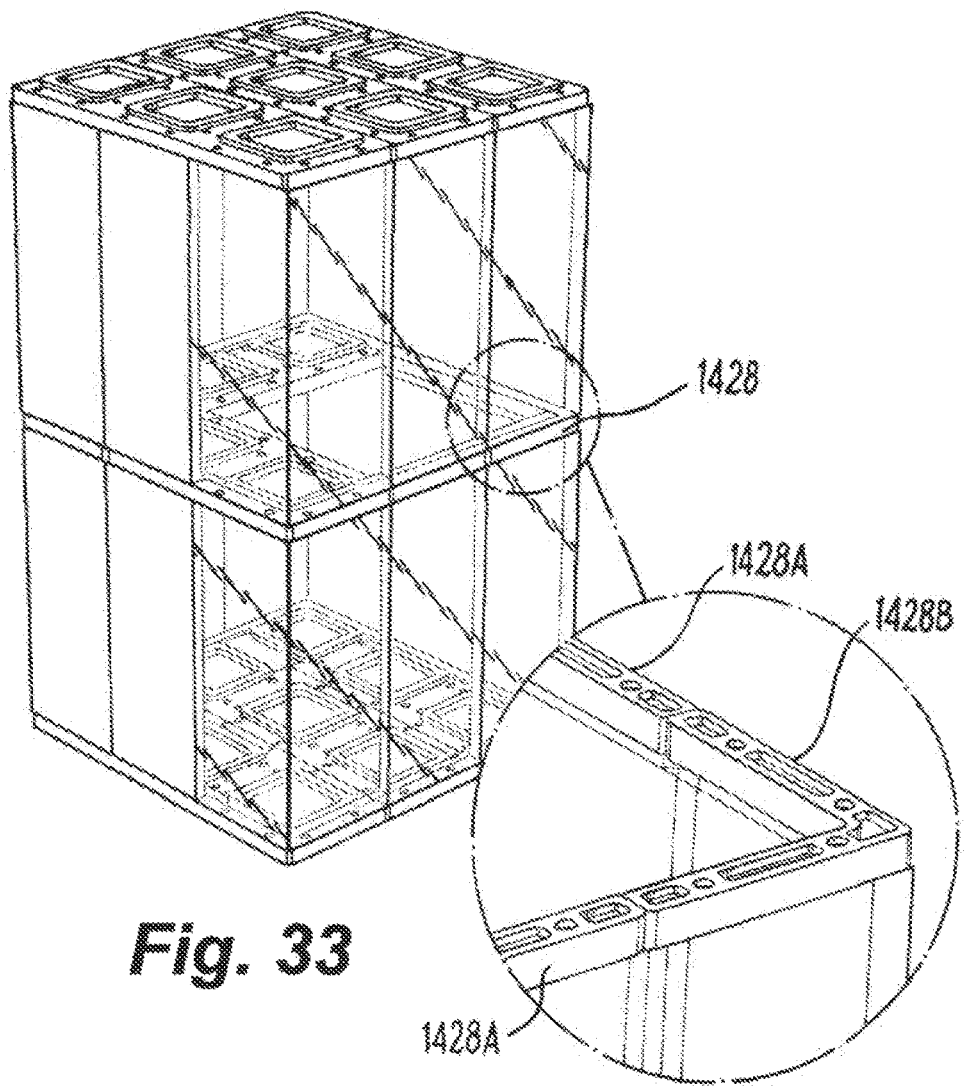
Figure 34:
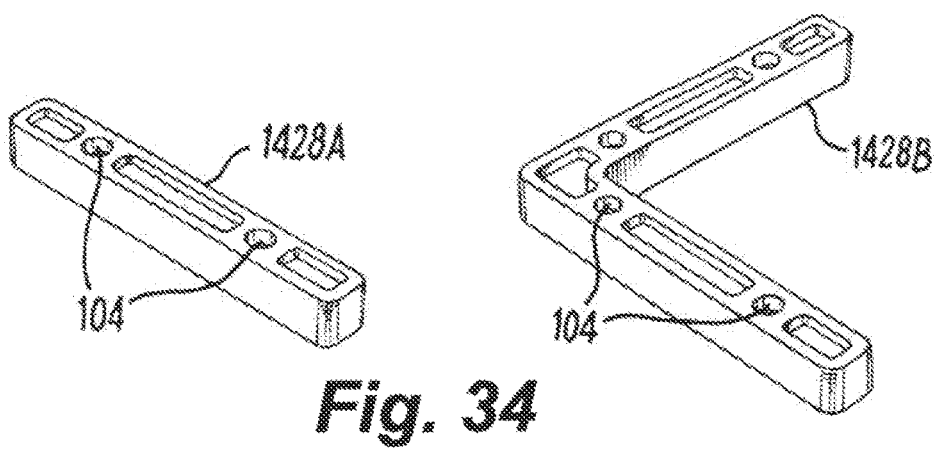
Figure 35A:
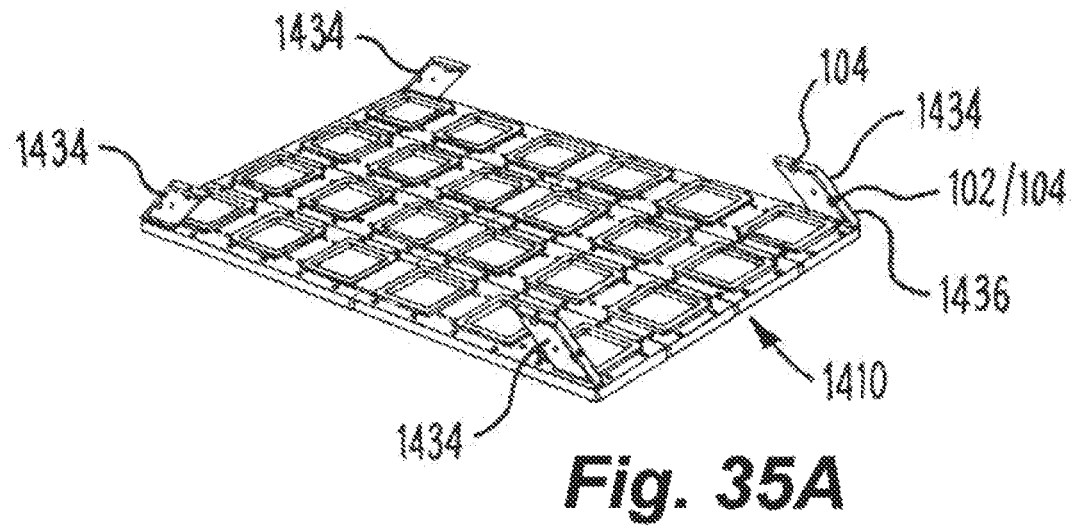
Figure 35B:
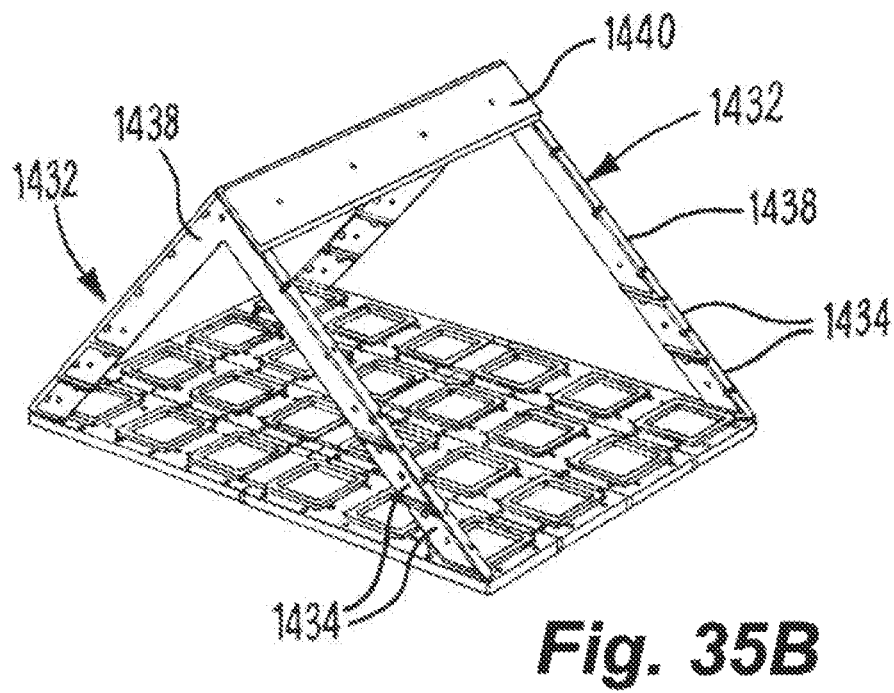
Figure 35C:
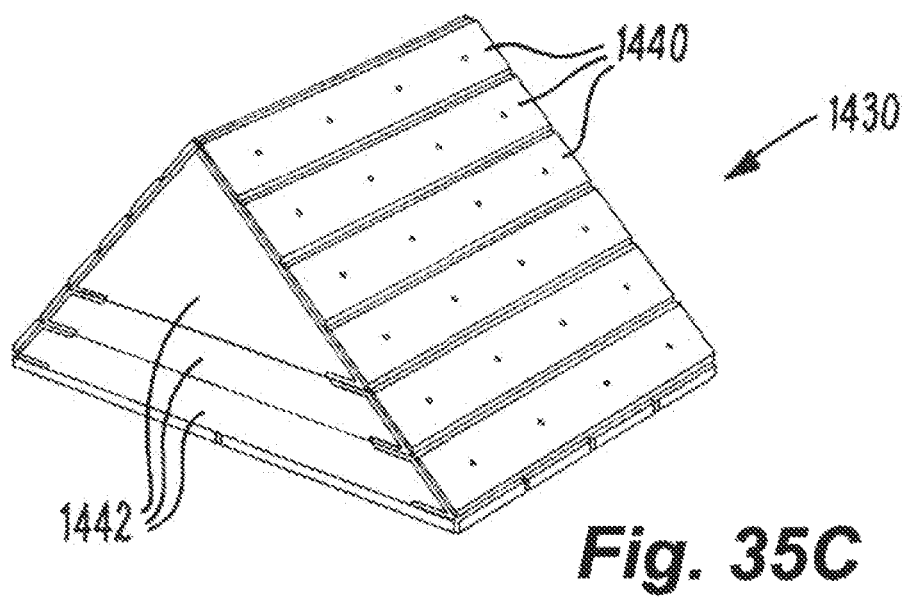
Figure 35D:
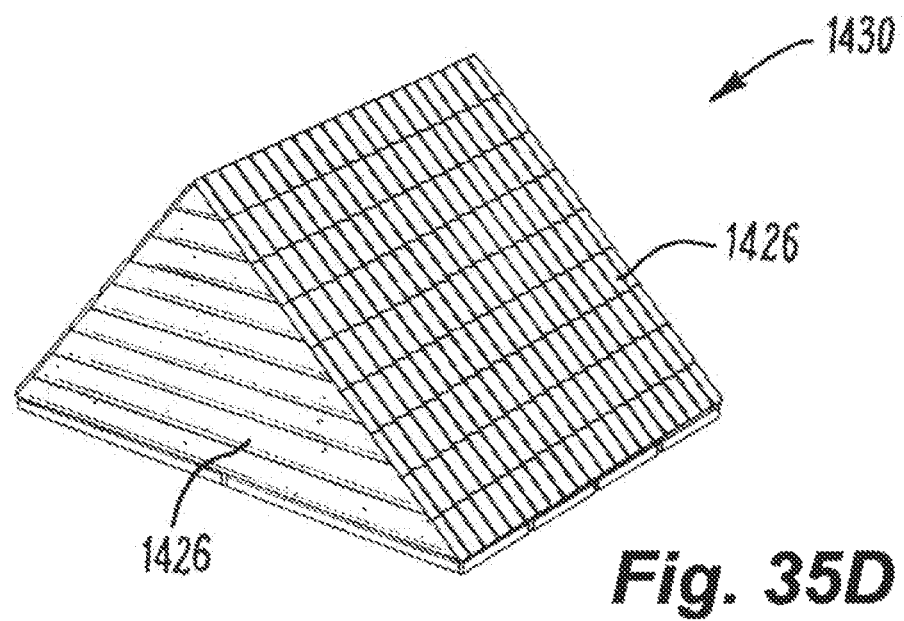
Figure 35E:
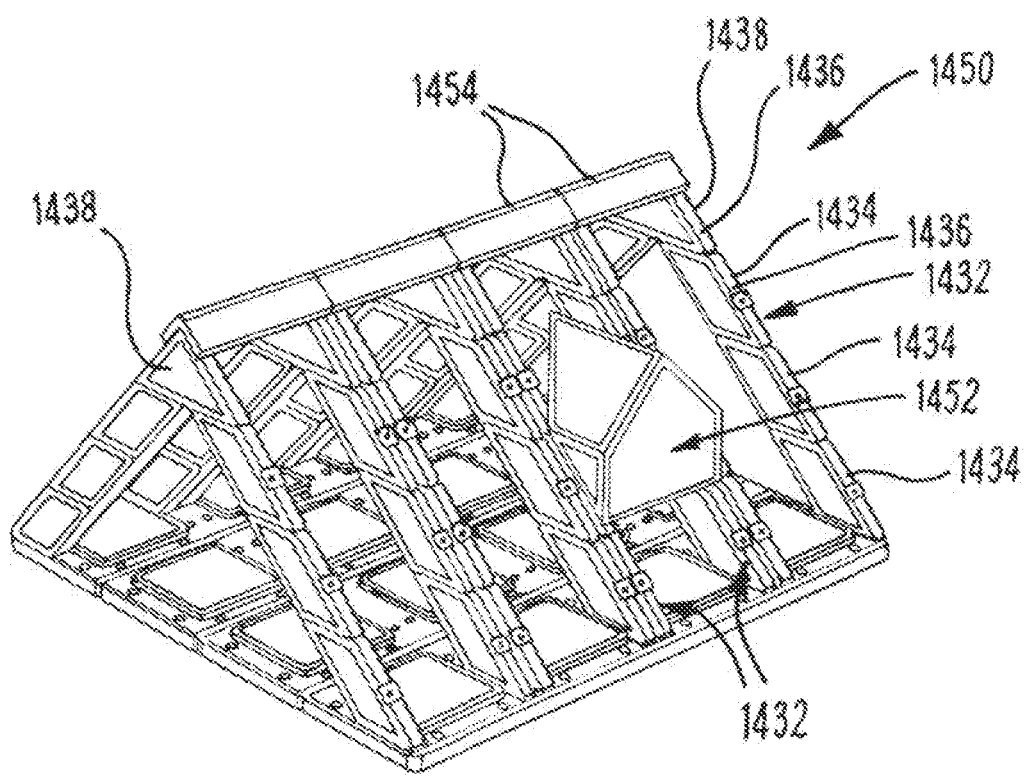
Figure 35F:
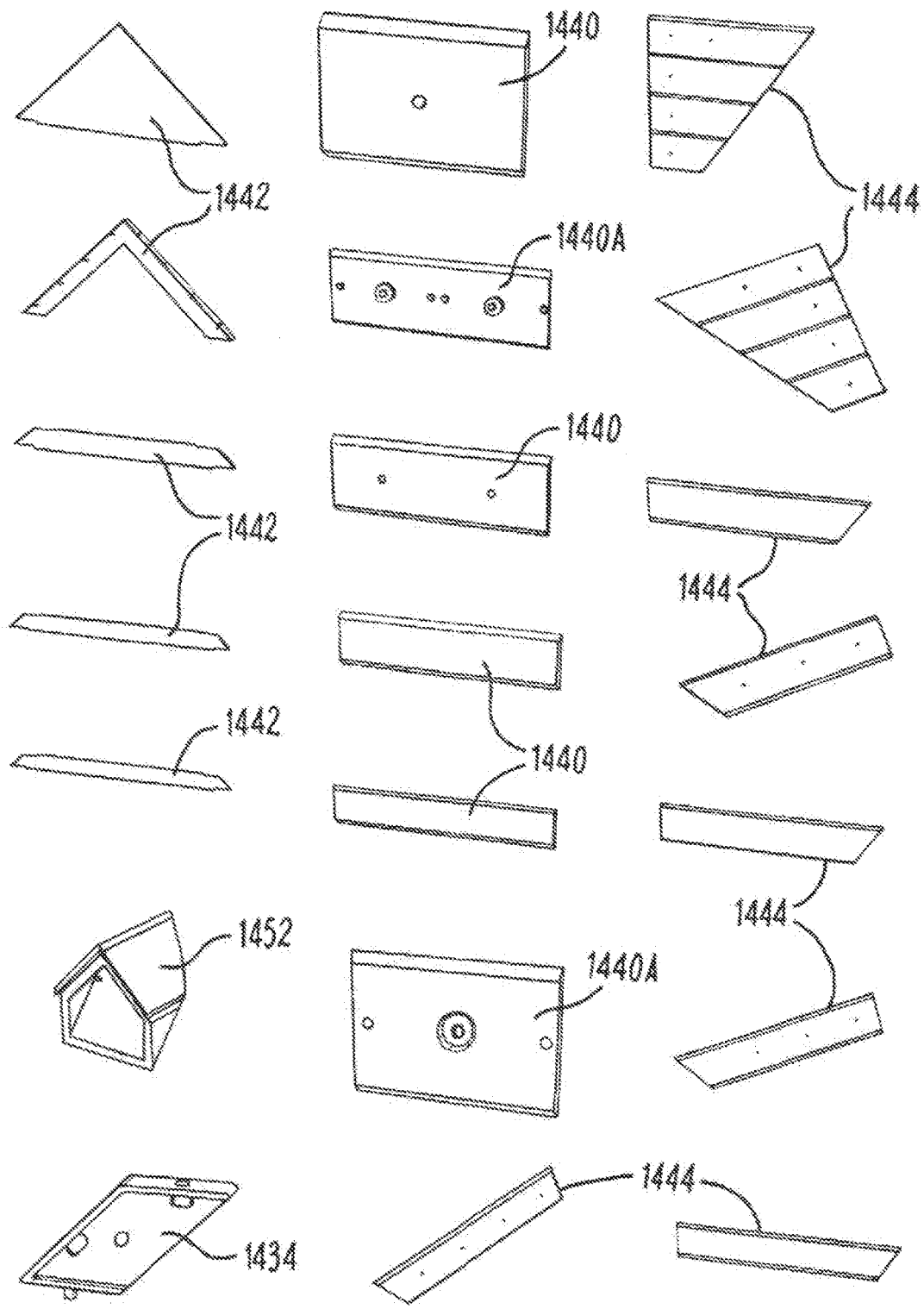
Figure 35G:
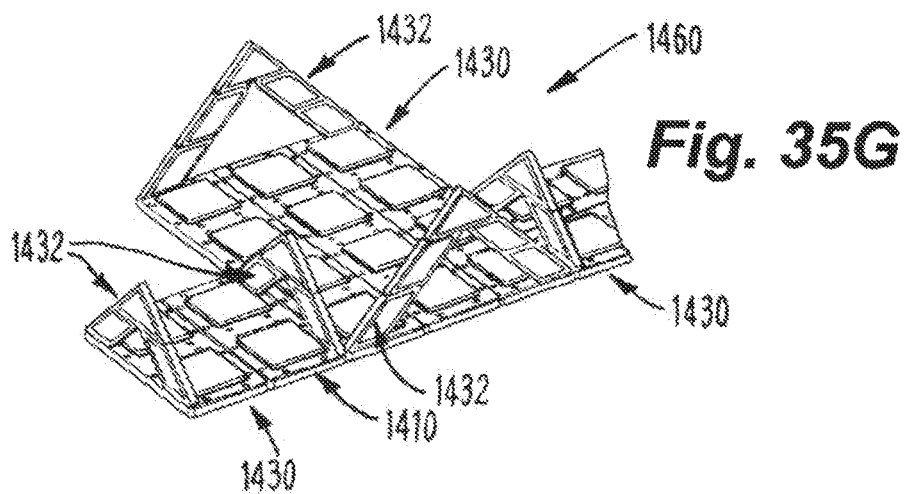
Figure 35H:
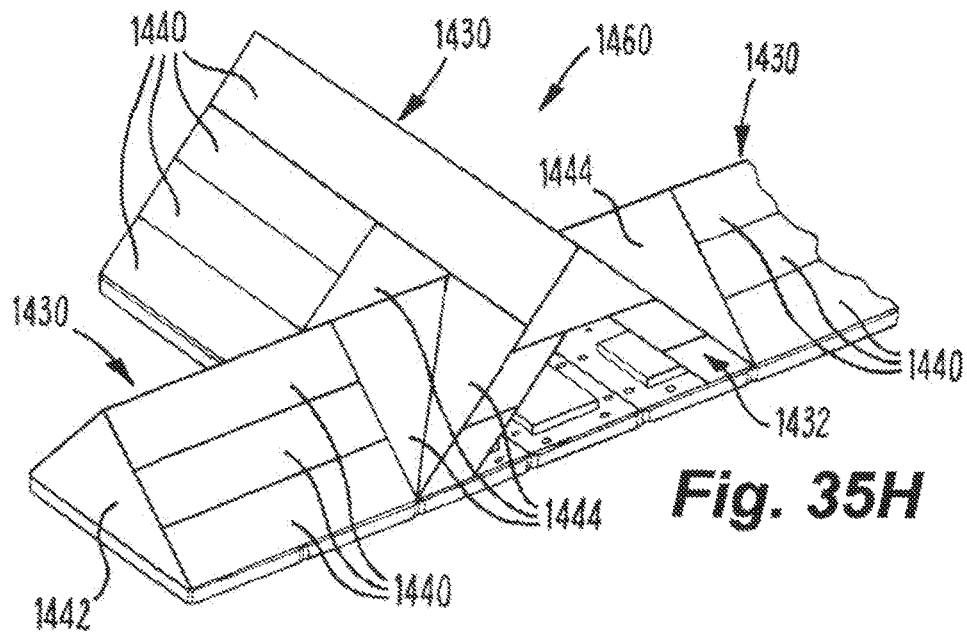
Figure 35I:
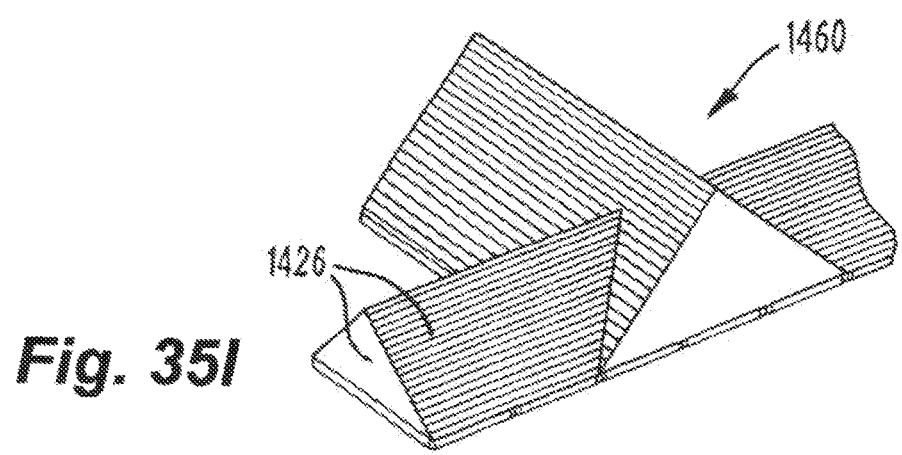

FIGS. 32A-G are perspective views of steps in the construction of the assembly of FIGS. 29-31;

FIGS. 33 and 34 are perspective views of accessory spacer parts for the assembly of FIGS. 29 to 32;

FIGS. 35A-D are perspective views of steps in the construction of one pitched roof sub-assembly for the assembly of FIGS. 29-32; FIG. 35E is a perspective view of another pitched roof sub-assembly in construction; FIG. 35F is a perspective view of parts for the pitched roof sub-assemblies of the invention; FIGS. 35G-I are perspective views of steps in the construction of a further pitched roof sub-assembly;

FIGS. 36A-G are perspective views of steps in the construction of still another modelling assembly;

FIGS. 37A and 37B are perspective views of a floor part of still yet another modelling assembly;

FIG. 38 is a perspective view of part of the still yet another assembly; and

FIG. 39 is a perspective view of an enlarged detail of the part of the still yet another assembly of FIGS. 37 and 38.

FIGS. 1 to 28 show a first embodiment of the invention.

Figure 1:
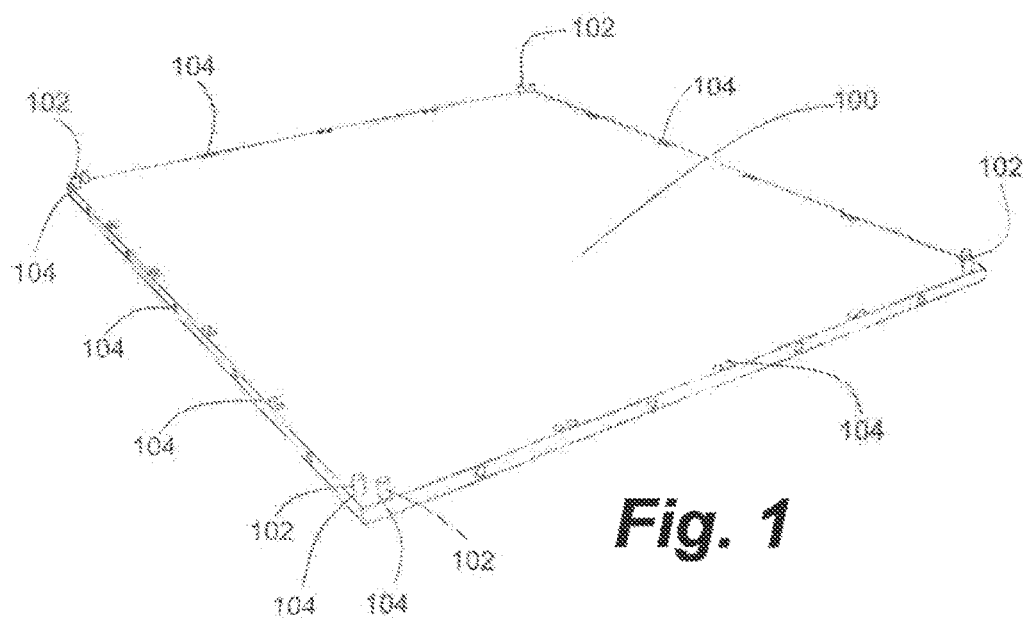
FIG. 1 is a perspective view of a floor part in the form of a base slab from a modelling assembly in accordance with the present invention.
Figure 2:
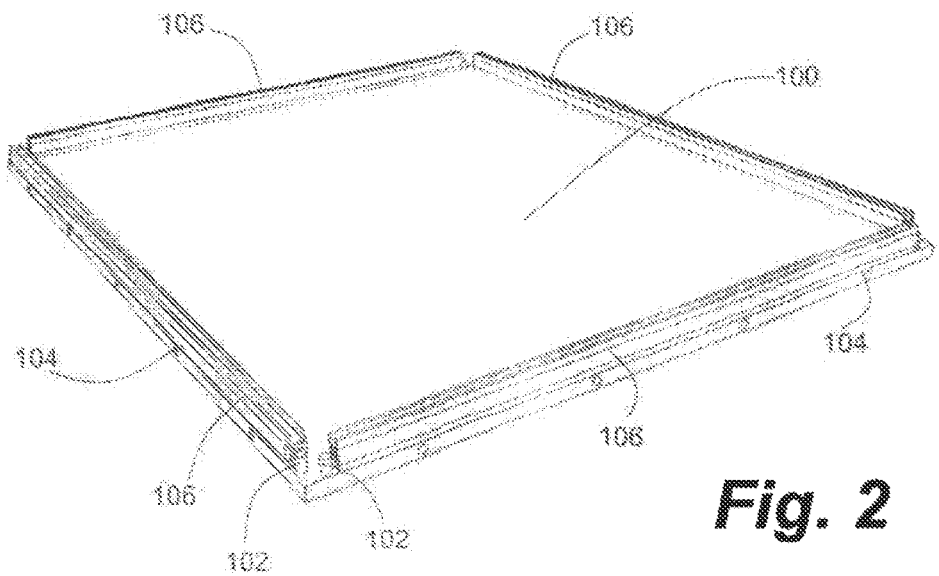
FIG. 2 is a perspective view of the base slab of FIG. 1 with lower cross beams from a modelling assembly in accordance with the present invention.

Referring to FIGS. 1 to 28, a modelling assembly 600 includes a floor part in the form of a base slab indicated generally by reference numeral 100 comprising pegs 102 which have been placed in and protrude upwardly out of peg receiving holes 104, which could be through holes. In FIG. 2 it can be seen that frame parts in the form of framework pieces 106 form lower cross beams on the base slab 100. There are four framework pieces 106 which extend substantially around the sides of the base slab 100.

Figure 3:
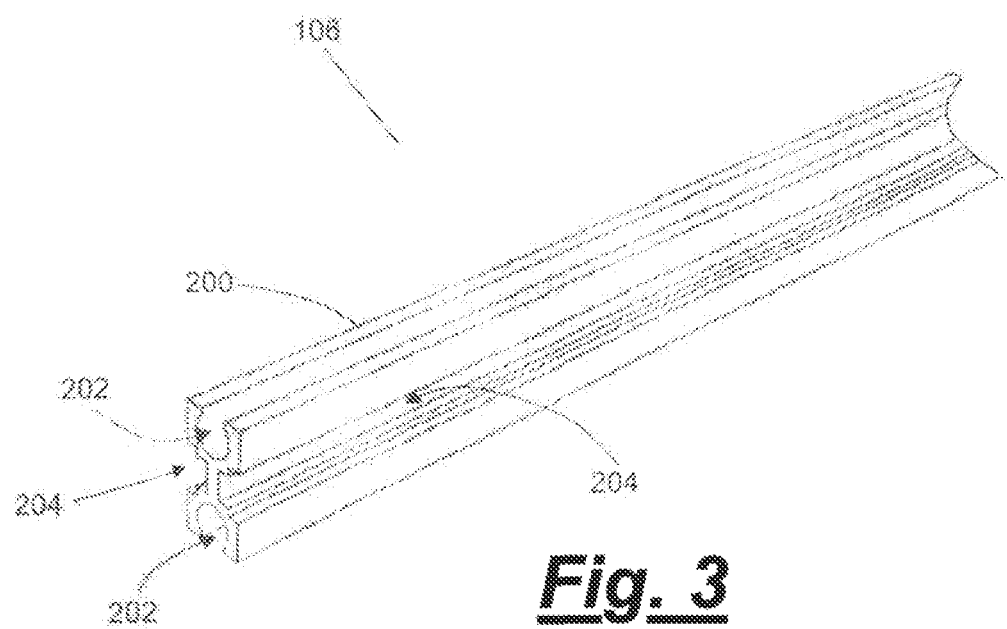
FIG. 3 is a perspective view of a framework piece from a modelling assembly in accordance with the present invention.
Figure 4:
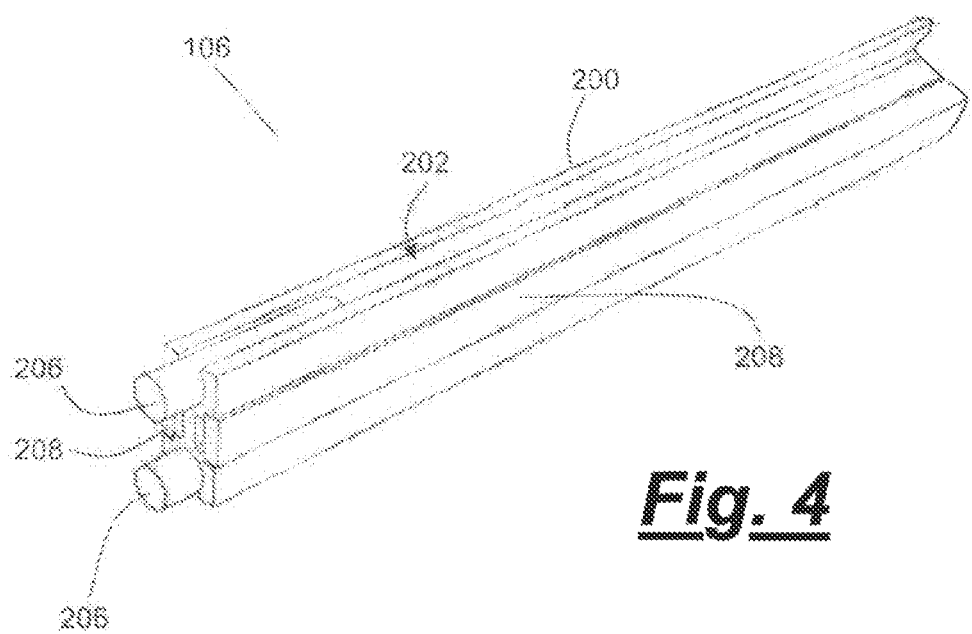
FIG. 4 is a perspective view of the framework piece of FIG. 3 with abutment studs and magnetic strips from a modelling assembly in accordance with the present invention.

Referring to FIGS. 3 and 4, the framework pieces 106 comprise a shaped elongated beam 200 having a pair of abutment stud receiving channels 202. Abutment studs 206 are placed in the abutment stud receiving channels 202. The abutment studs 206 are the same as the pegs 102. The abutment studs 206 in one framework piece 106 are dimensioned to fit in corresponding complementary abutment stud receiving channels 202 on another framework piece 106 so as to connect the two framework pieces 106 together to form a structure.

Each framework piece 106 includes mountings 203 for mounting external wall parts 500 and interior wall parts 400. Each mounting 203 comprises magnetic strip receiving cut-outs 204 defined by the framework piece 106 and magnetic members in the form of strips 208 located in the magnetic strip receiving cut-outs 204 as shown in FIG. 4. The magnetic strips 208 are mounted on opposing sides of the shaped elongated beam 200, on an outwardly facing side and an inwardly facing side.

Figure 5:
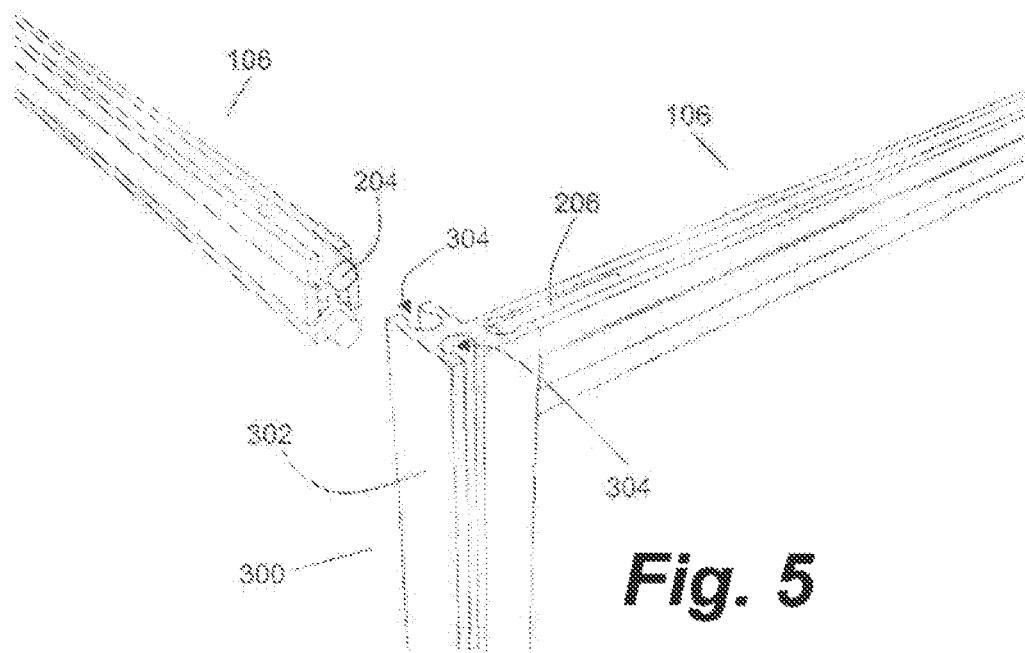
FIG. 5 is a perspective view of a corner connection between a corner upright and a pair of cross beam from a modelling assembly in accordance with the present invention.

With reference to FIG. 5, a corner framework piece 300 comprises a shaped elongated pole 302 having abutment stud receiving channels 304. The abutment stud receiving channels 304 are provided in triplicate on the shaped elongated pole 302 to allow framework pieces 106 to be joined to the corner framework piece 300 to form a straight continuous frame and/or at substantially orthogonal angles to one another to form a corner. In FIG. 5, the two framework pieces 106 shown are arranged orthogonally to one another to form a corner of a structure.

Figure 6:
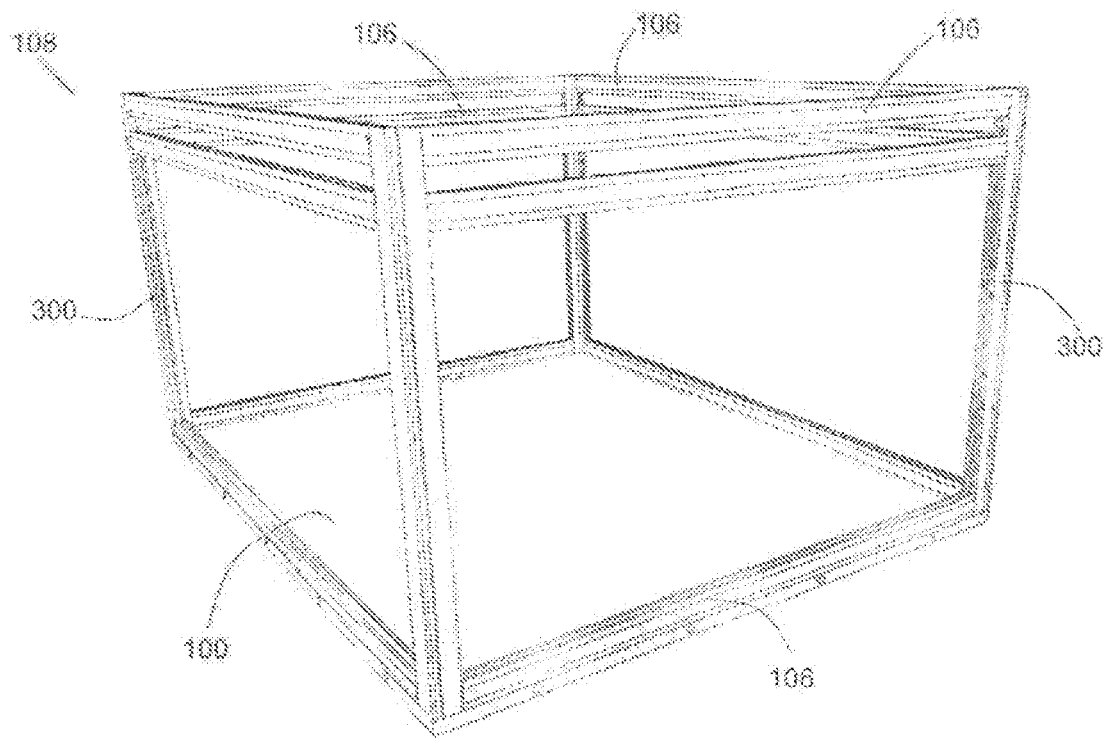
FIG. 6 is a perspective view of a plurality of framework pieces of FIG. 3 forming a supporting structure in accordance with the present invention.
Figure 7:
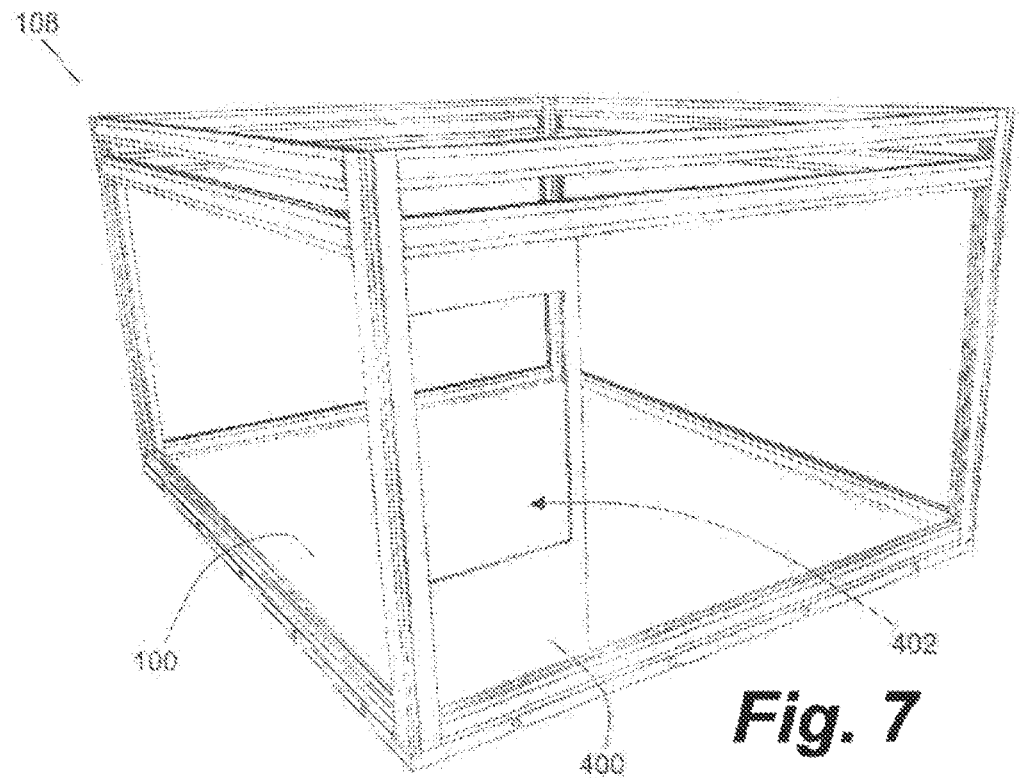
FIG. 7 is a perspective view of the supporting structure of FIG. 6 receiving and holding an interior wall panel in accordance with the present invention.
Figure 8:
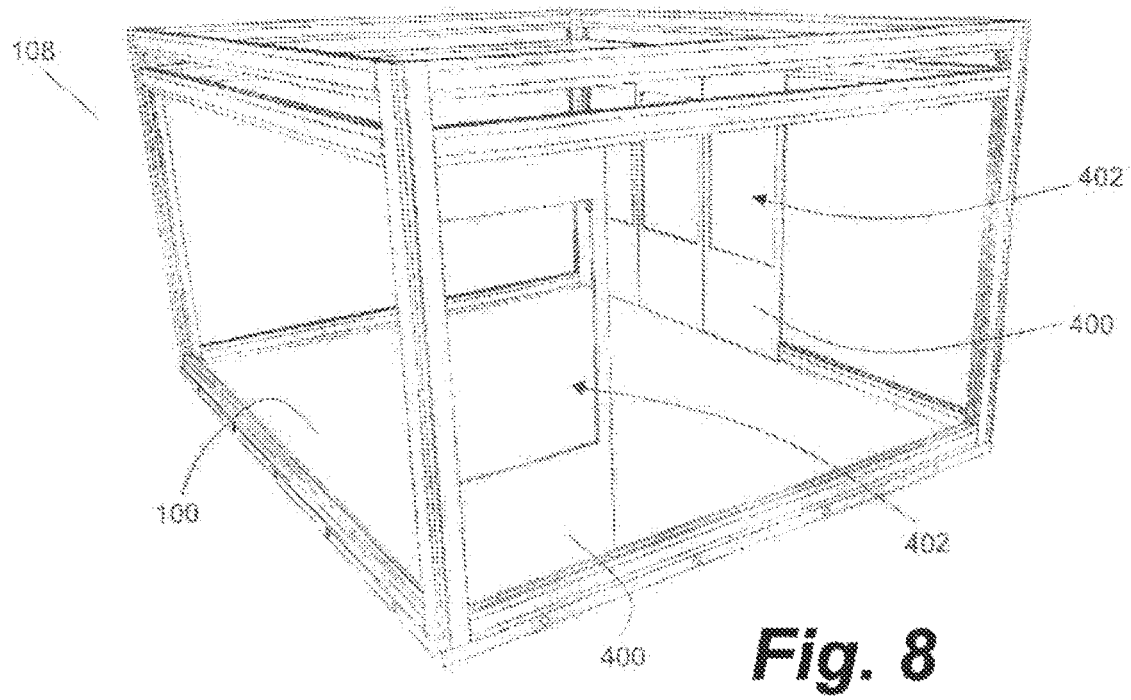
FIG. 8 is a perspective view of the supporting structure of FIG. 6 receiving and holding a plurality of interior wall panels in accordance with the present invention.
Figure 9:
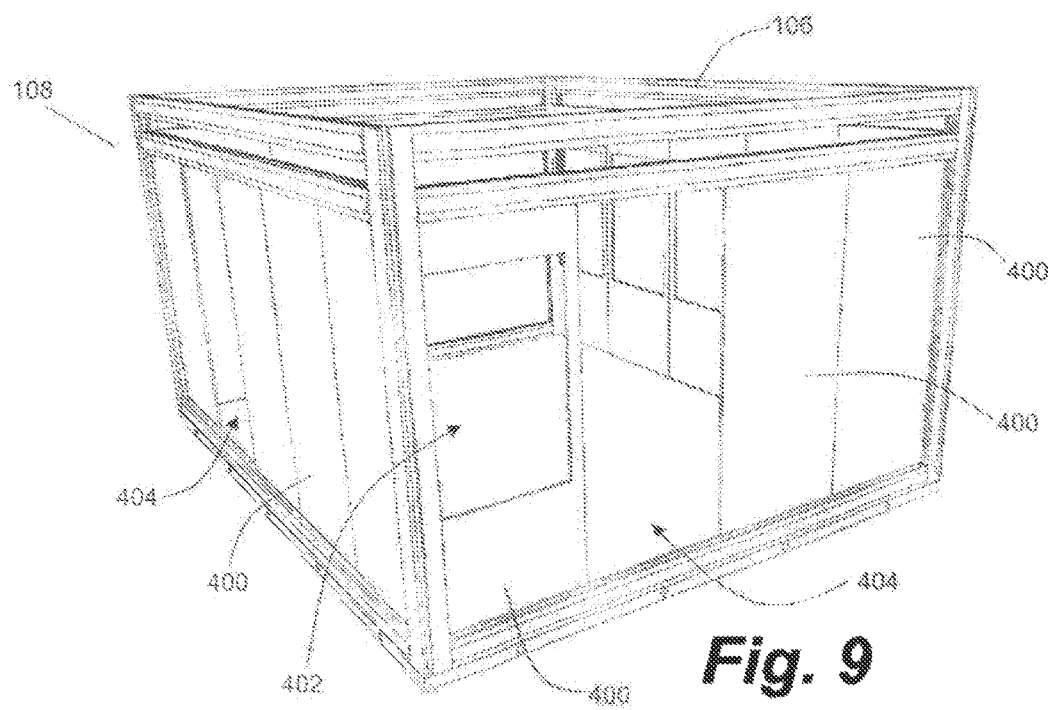
FIG. 9 is a perspective view of the supporting structure of FIG. 6 receiving and holding a plurality of interior wall panels in accordance with the present invention.
Figure 10:
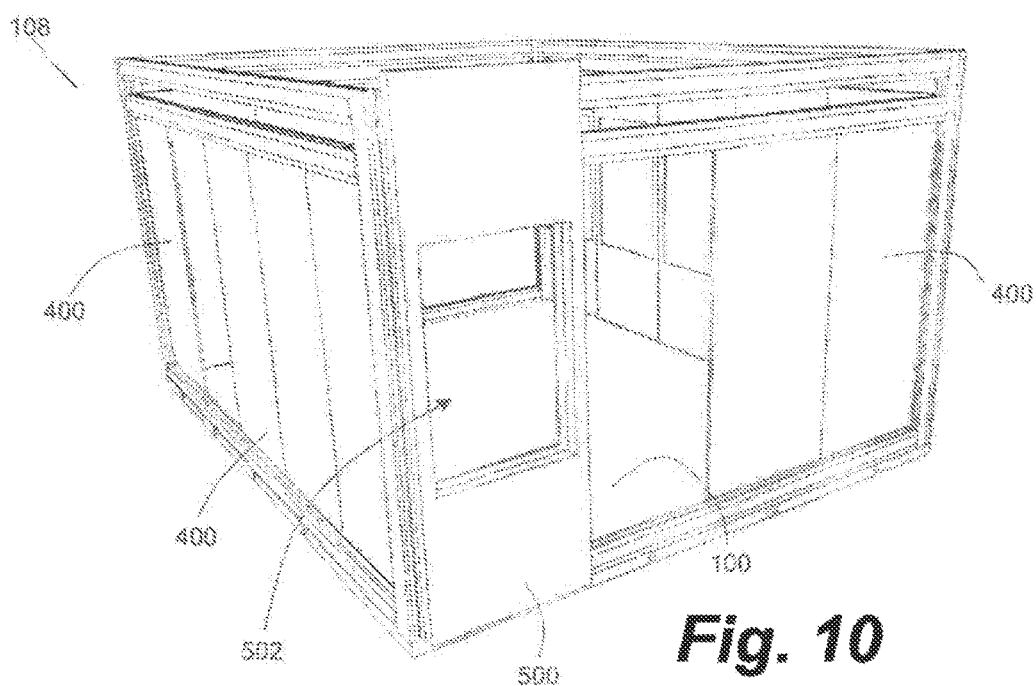
FIG. 10 is a perspective view of the supporting structure of FIG. 6 receiving and holding a plurality of interior wall panels and an exterior façade panel in accordance with the present invention.
Figure 11:
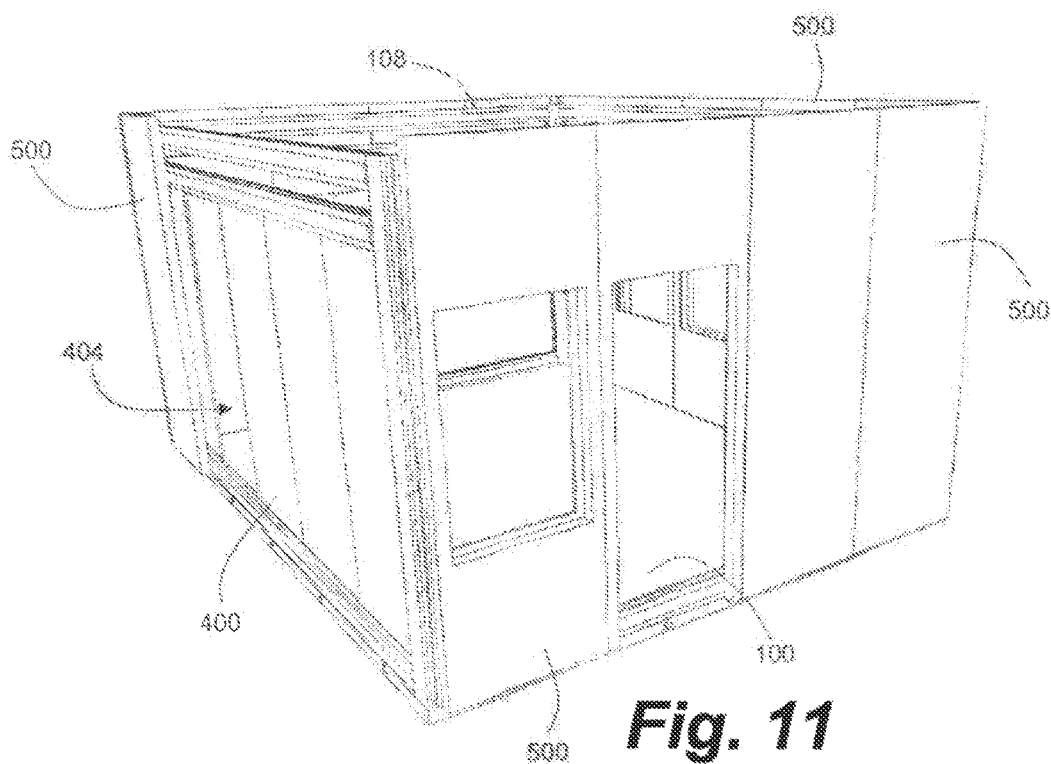
FIG. 11 is a perspective view of the supporting structure of FIG. 6 receiving and holding a plurality of interior wall panels and a plurality of exterior façade panels in accordance with the present invention.
Figure 12:
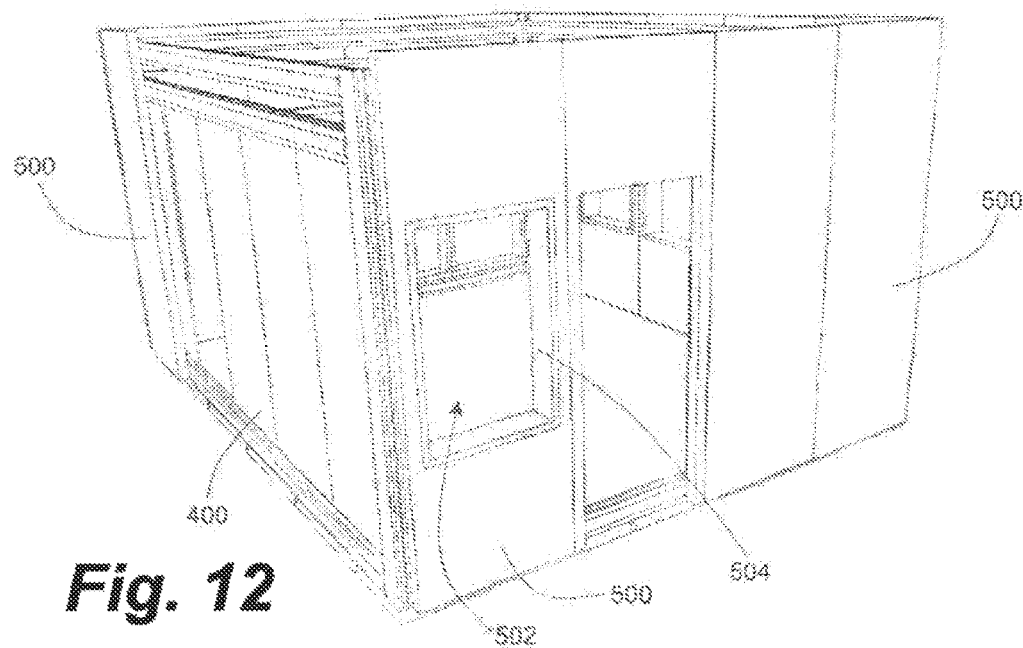
FIG. 12 is a perspective view of the supporting structure of FIG. 6 receiving and holding a plurality of interior wall panels, a plurality of exterior façade panels and a plurality of window aperture frames in accordance with the present invention.
Figure 13:
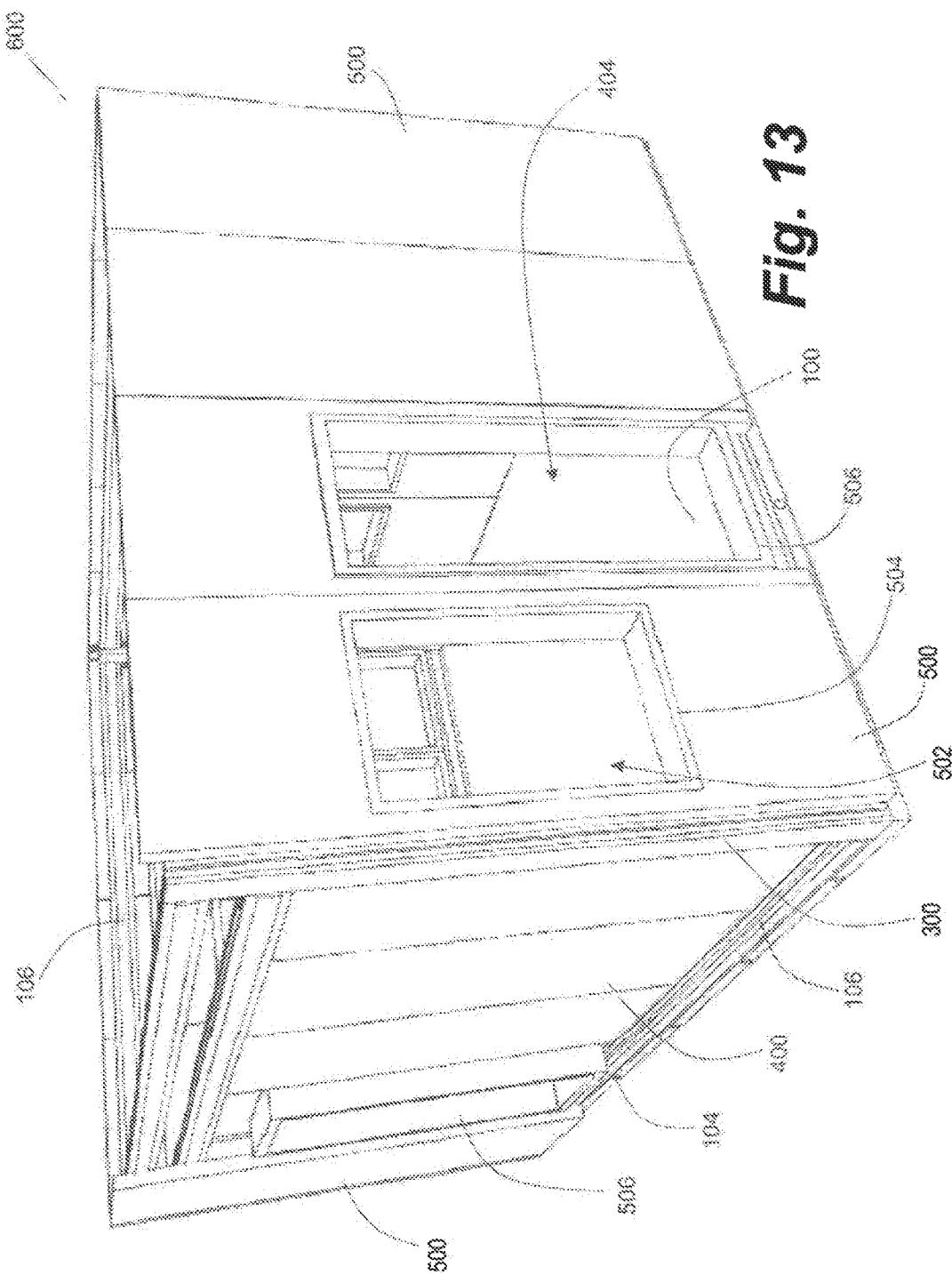
FIG. 13 is a perspective view of the supporting structure of FIG. 6 receiving and holding a plurality of interior wall panels, a plurality of exterior façade panels, a plurality of window aperture frames and a plurality of door aperture frames forming a modelling assembly in accordance with the present invention.

As seen in FIG. 6, the framework pieces 106 and the corner framework pieces 300 are placed on the base slab 100 to form a supporting structure 108. The supporting structure 108 comprises the base slab 100, four framework pieces 106 acting as lower cross beams resting on the base slab 100, four corner framework pieces 300 at each corner of the base slab 100 and connected to the base slab 100 using the corner abutment pegs 102. Framework pieces 106 are connected between adjacent corner framework pieces 300 at upper ends of the corner framework pieces 300. The framework pieces 106 at upper ends of the corner framework pieces 300 are arranged as double upper cross beams and all the framework pieces 106 acting as the lower cross beams and the upper cross beams comprise the magnetic strips 208 on both an outwardly facing portion of the supporting structure 108 and on an inwardly facing portion of the supporting structure 108.

Referring to FIGS. 7 to 13 inclusive, external wall parts in the form of exterior façade panels 500 and interior wall parts in the form of panels 400 are removably connected to the supporting structure 108. The exterior façade panels 500 and the interior wall panels 400 are received and held in place against the supporting framework 108. The interior wall panels 400 are planar and may define an inner window aperture 402. The side of the interior wall panels 400 which face inwardly towards the centre of the supporting structure 108 may comprise a design pattern to replicate an interior design of a room. For example, a wood panelling effect may be replicated or a wallpapered effect may be alternatively replicated. It will be appreciated that any type of design may be printed on the inwardly facing side of the interior wall panels 400, or, a design may be printed on a sticker or adhesive carrying sheet to allow the sheet to be affixed to the interior wall panels 400. The interior wall panels 400 connect by magnetic attraction to the supporting structure 108. Therefore, it is preferable that the interior wall panels 400 are comprised of a ferromagnetic material.

Similarly, the exterior façade panels 500 connect by magnetic attraction to the supporting structure 108 and it is also preferable that the exterior façade panels 500 are comprised of a ferromagnetic material.

Gaps 404 may be left in a side of the supporting structure 108 to replicate the presence of a throughway, archway, door or the like.

The exterior façade panels 500 are also substantially planar and may similarly define an outer window aperture 502. The side of the exterior façade panels 500 which face outwardly away from the centre of the supporting structure 108 may comprise a design pattern to replicate an exterior design or cladding of a building. For example, a brickwork, stonework or plastering effect can be replicated. It will be appreciated that any type of design may be printed on the outwardly facing side of the exterior façade panels 500, or, a design may be printed on a sticker or adhesive carrying sheet to allow the sheet to be affixed to the exterior façade panels 500.

Magnetic sheets of paper may be used as the interior wall panels 400 and exterior façade panels 500 as this will allow any design or pattern or the like to be printed on the interior wall panels 400 and the exterior façade panels 500 to replicate the appropriate building and/or redesign characteristics.

The exterior façade panels 500 with outer window apertures 502 are connected to the supporting structure 108 in a complementary corresponding position to the interior wall panels 400 that have inner window aperture 402 such that the inner window aperture 402 and the outer window aperture 502 are aligned to form a window aperture. Window frames 504 are arranged in the window aperture and door frames 506 are placed on the supporting structure 108 to form aperture frames which extend across the spacing between the exterior façade panels 500 and corresponding interior wall panels 400. The modelling assembly 600 is complete and both the exterior and interior of a building can be replicated to show to a potential client.

The framework pieces 106 are constructed of a metallic element in the present invention although it will be readily appreciated that plastics materials could be alternatively used or composite materials may be alternatively used. In yet a further preferred embodiment, the framework pieces 106 may be moulded or extruded to have formed on the framework pieces 106 themselves at least some of the pegs and slots used mount the framework pieces 106 to each other when forming the supporting structure 108. In one embodiment, the magnetic strips 208 permanently mounted on opposing sides of the framework piece 106, on an outwardly facing side and an inwardly facing side of the framework piece 106. In another embodiment the magnetic strips 208 are embedded within the framework piece 106, allowing a magnetic field to extend outwardly from the framework piece 106 on an outwardly facing side and an inwardly facing side of the framework piece 106. A single magnetic element may be embedded in a plastics based framework piece 106 allowing a magnetic flux to extend outwardly from the framework piece 106 on an outwardly facing side and an inwardly facing side of the framework piece 106.

It will be understood that the exterior façade panels 500 and/or interior wall panels 400 may be non-planar to replicate a texture or architectural feature on or in a building.

Figure 14:
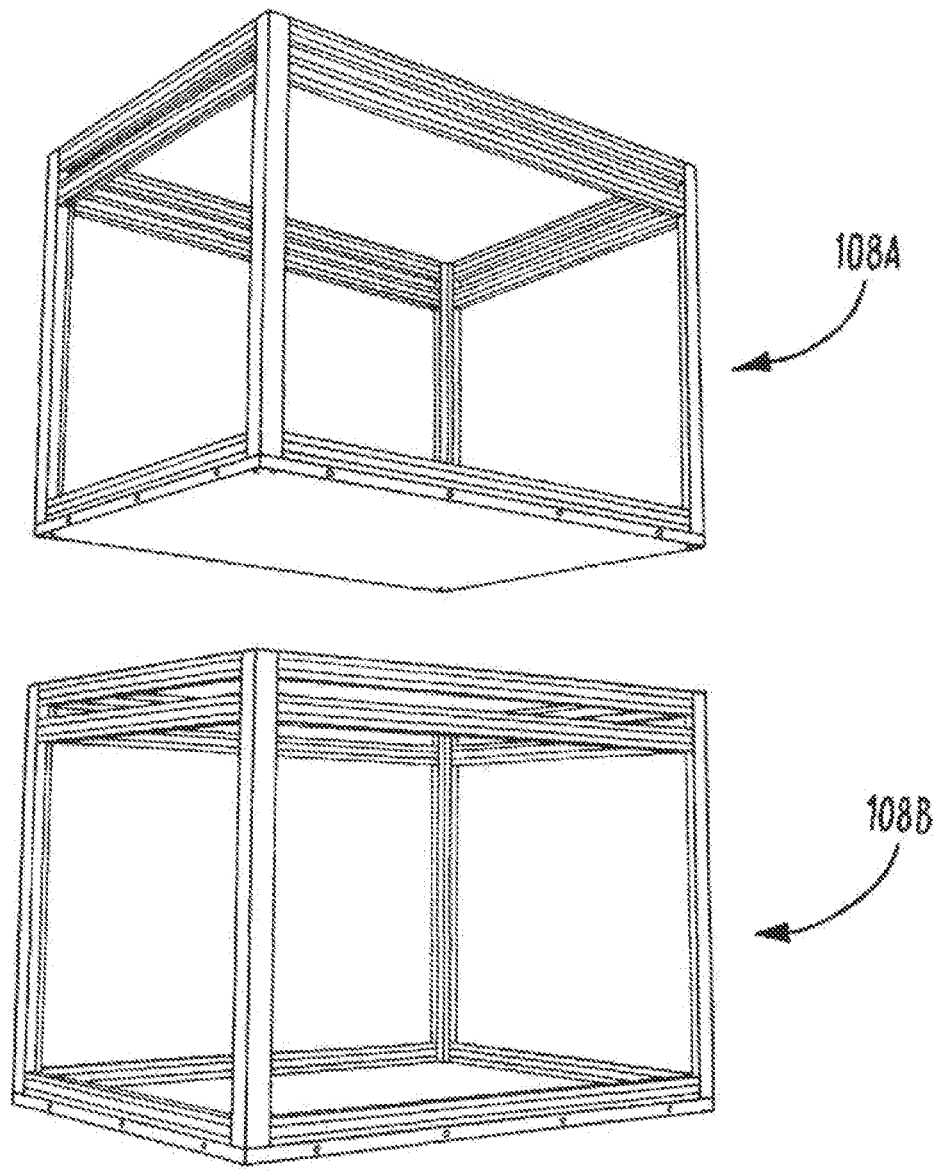
FIG. 14 is a perspective view of a pair of supporting structures as shown in FIG. 6 with one supporting structure situated above the other.
Figure 15:
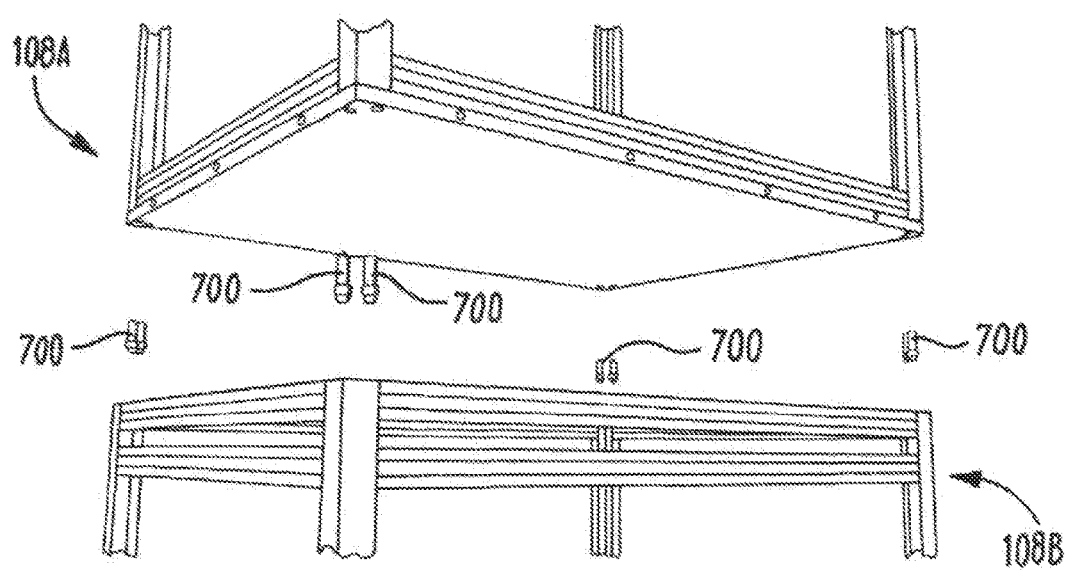
FIG. 15 is a detail perspective view of the supporting structures of FIG. 14 being converged together, along with a plurality of corner abutment pegs arranged between the converging supporting structures to connect and hold the supporting structures forming a double height modelling assembly in accordance with an embodiment of the present invention.
Figure 16:
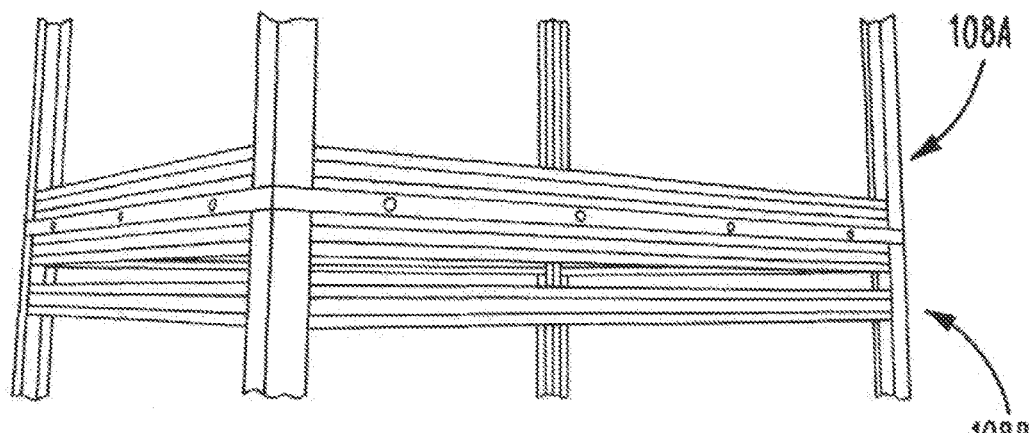
FIG. 16 is a detail perspective view of the pair of supporting structures of FIG. 14 converged together forming a double height modelling assembly in accordance with an embodiment of the present invention.
Figure 17:
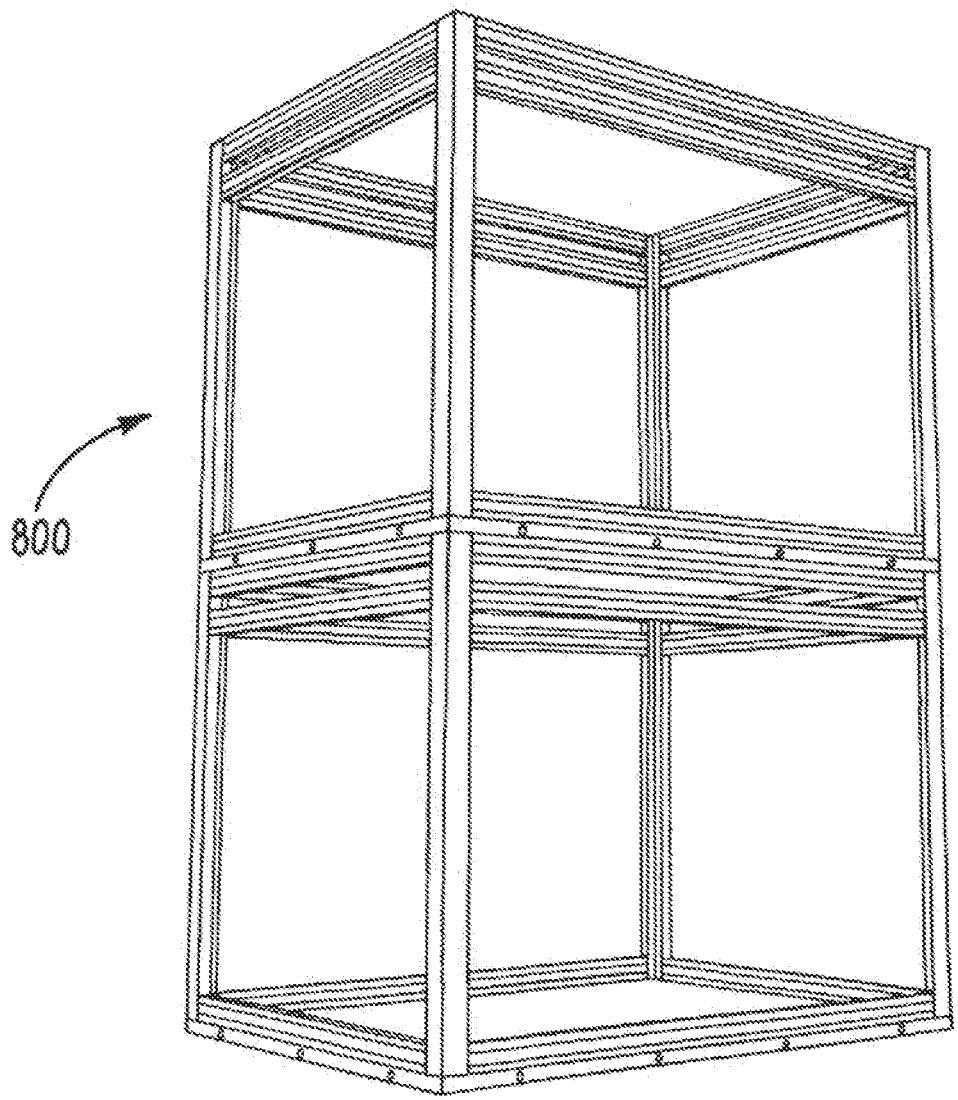
FIG. 17 is a perspective view of the pair of supporting structures of FIG. 14 converged together forming a double height modelling assembly in accordance with an embodiment of the present invention.

Referring to FIG. 14, wherein like parts previously described have been assigned the same reference numerals, there are provided two supporting structures 108A and 108B, with an upper supporting structure 108A situated above a lower supporting structure 108B. With references to FIG. 15-17, the upper supporting structure 108A is located on the lower supporting structure 108 with retaining pegs 700 used to connect and hold the upper supporting structure 108A to the lower supporting structure 108B to form a double height modelling assembly 800 in accordance with an embodiment of the present invention. It will be understood that a plurality of supporting structures 108 may be stacked atop one another to form a multiple height modelling assembly (not shown). As hereinbefore described, exterior façade panels 500 and interior wall panels 400 may be removably connected to the double height modelling assembly 800.

Figure 18:
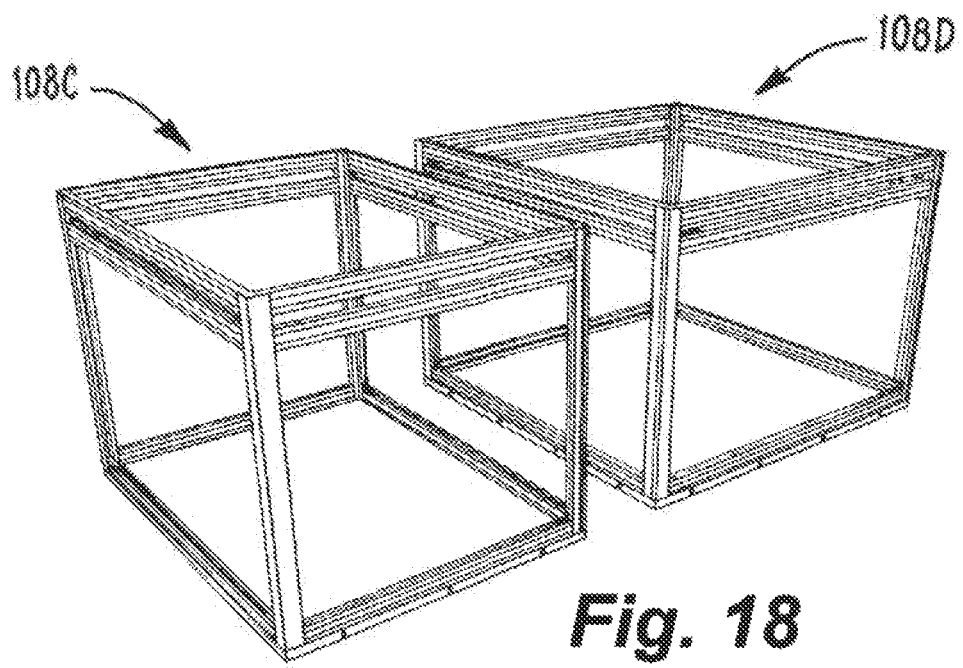
FIG. 18 is a perspective view of a pair of supporting structures as shown in FIG. 6 with one supporting structure situated beside the other.
Figure 19:
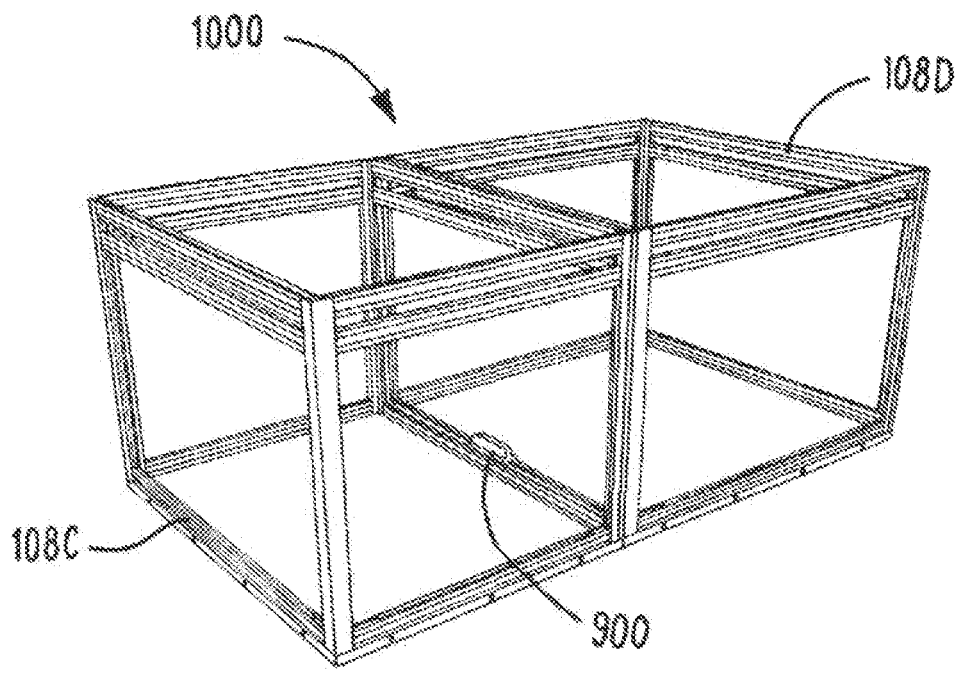
FIG. 19 is a perspective view of the pair of supporting structures as shown in FIG. 18 with the supporting structures converged together forming a double width modelling assembly in accordance with an embodiment of the present invention.

With reference to FIG. 18, wherein like parts previously described have been assigned the same reference numerals, a leftmost supporting structure 108C is situated beside a rightmost supporting structure 108D. Referring to FIG. 19, the leftmost supporting structure or 108C is connected to rightmost supporting structure 108D using a retaining clip 900 to form a double width modelling assembly 1000. It will be appreciated that any number of supporting structures 108 may be dipped together in a row to form a modelling assembly of any desired width and depth. Moreover, further supporting structures may be connected at top so that an overall modelling assembly of any width, depth and height can be accomplished.

Figure 20:
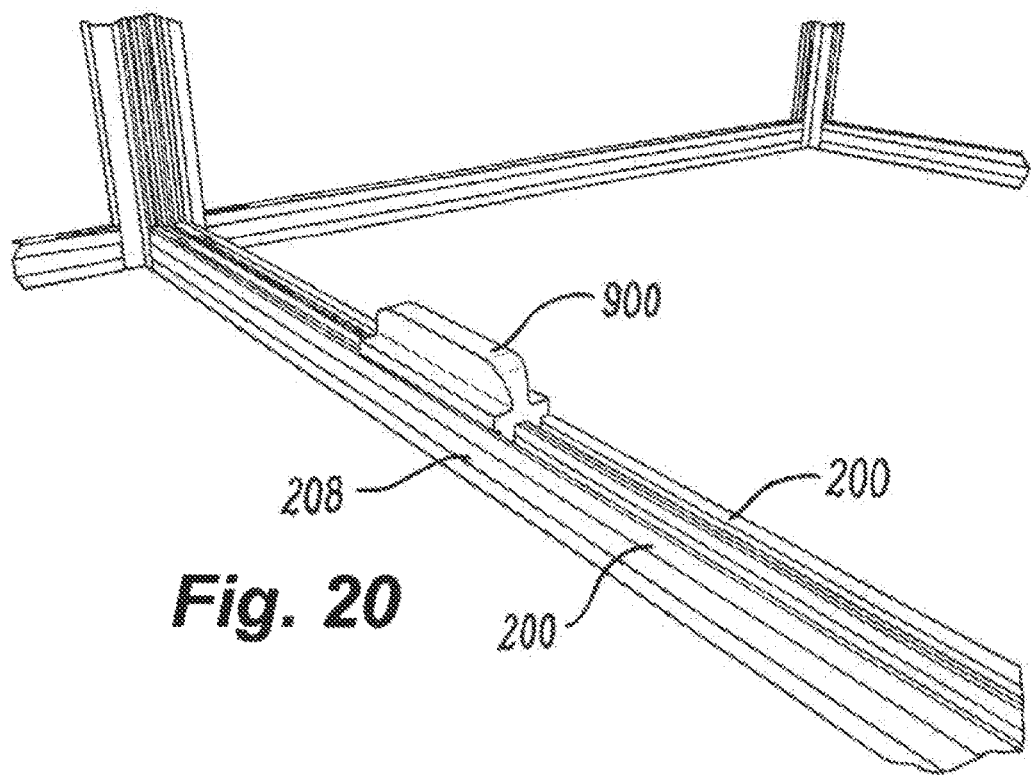
FIG. 20 is a detail perspective view of the pair of supporting structures as shown in FIG. 19, along with a retaining clip holding the pair of supporting structures together.
Figure 21:
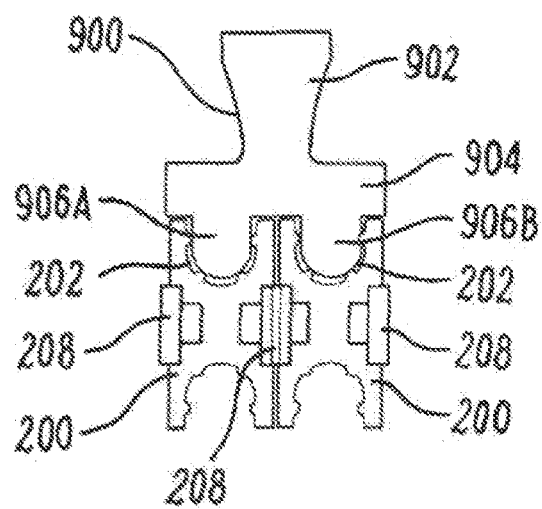
FIG. 21 is a cross sectional view of a framework piece of the pair of supporting structures of FIG. 19 with the retaining clip of FIG. 20 holding the pair of supporting structures together.

With reference to FIGS. 20 and 21, the retaining clip 900 comprises a grippable handle portion 902 which extends upwardly from a body portion 904 which supports a pair of downwardly depending legs 906A and 906B that are spaced apart from one another and are dimensioned so as to form a snug fit within the receiving channels 202 on a pair of adjacent, parallel shaped elongate beams 200 which form part of the leftmost supporting structure and rightmost supporting structure.

Figure 22:
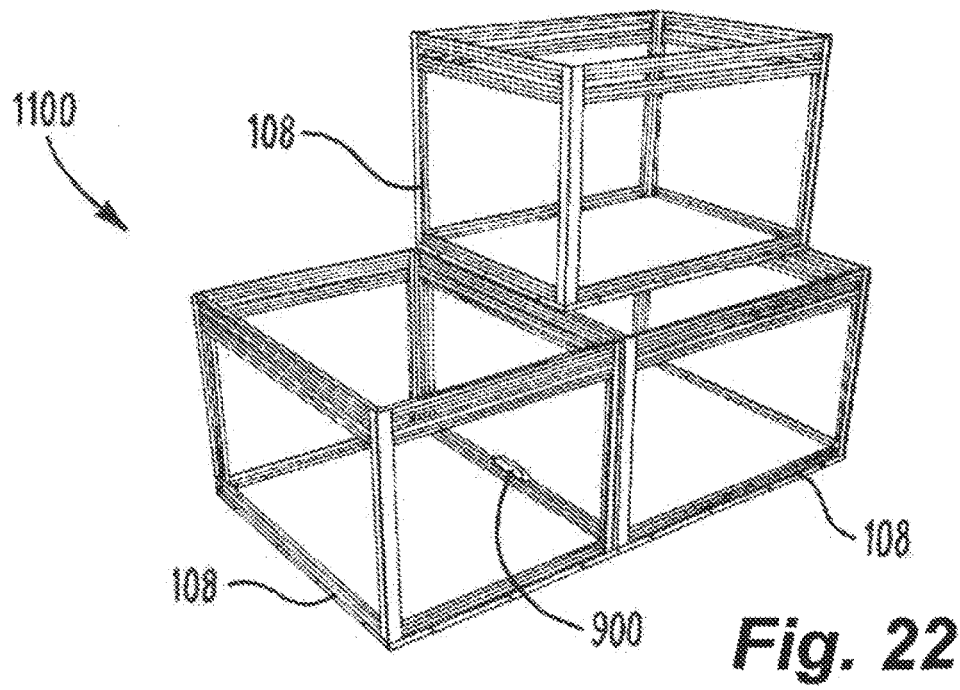
FIG. 22 is a perspective view of a plurality of supporting structure of FIG. 6 connected together.
Figure 23:
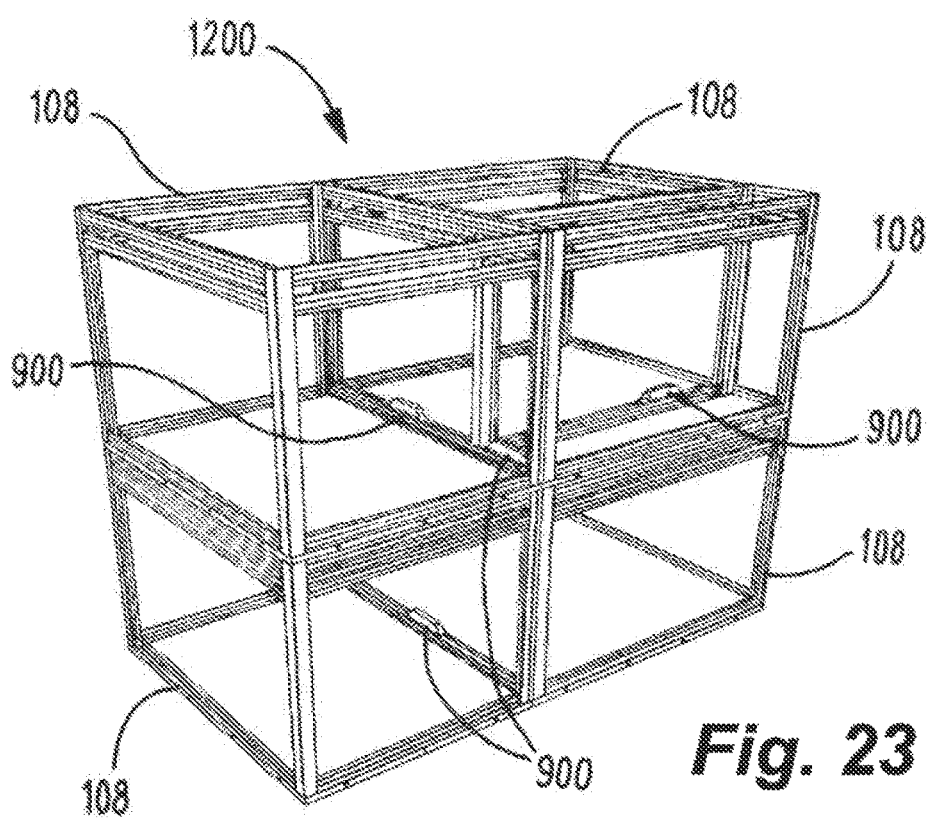
FIG. 23 is a perspective view of a plurality of supporting structures of FIG. 6 connected together.
Figure 24:
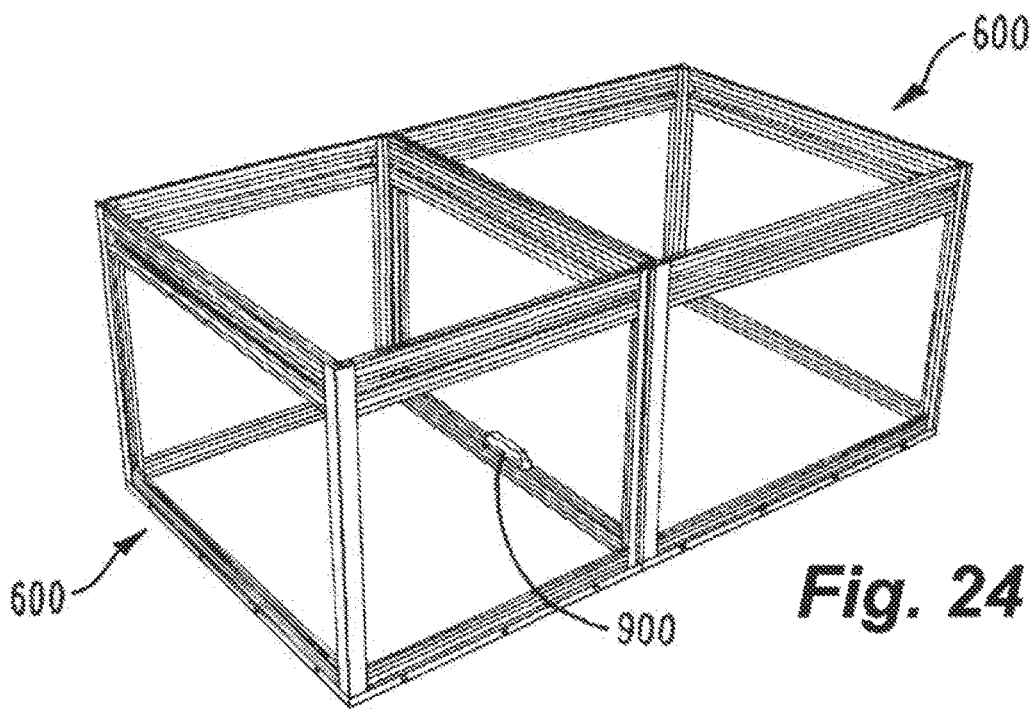
FIG. 24 is a perspective view of a pair of supporting structures as shown in FIG. 6 forming a partially completed modelling assembly.

Referring to FIGS. 22 and 23, wherein like parts previously described have been assigned the same reference numerals, the plurality of supporting structures 108 are connected in rows and stacks to form a complex, multi-roomed modelling structure 1100, 1200.

It will be understood that flooring and roofing parts may also be releasably connected to the supporting structures 108 to allow a type of floor and/or roof to be formed as part of the model.

Figure 25:
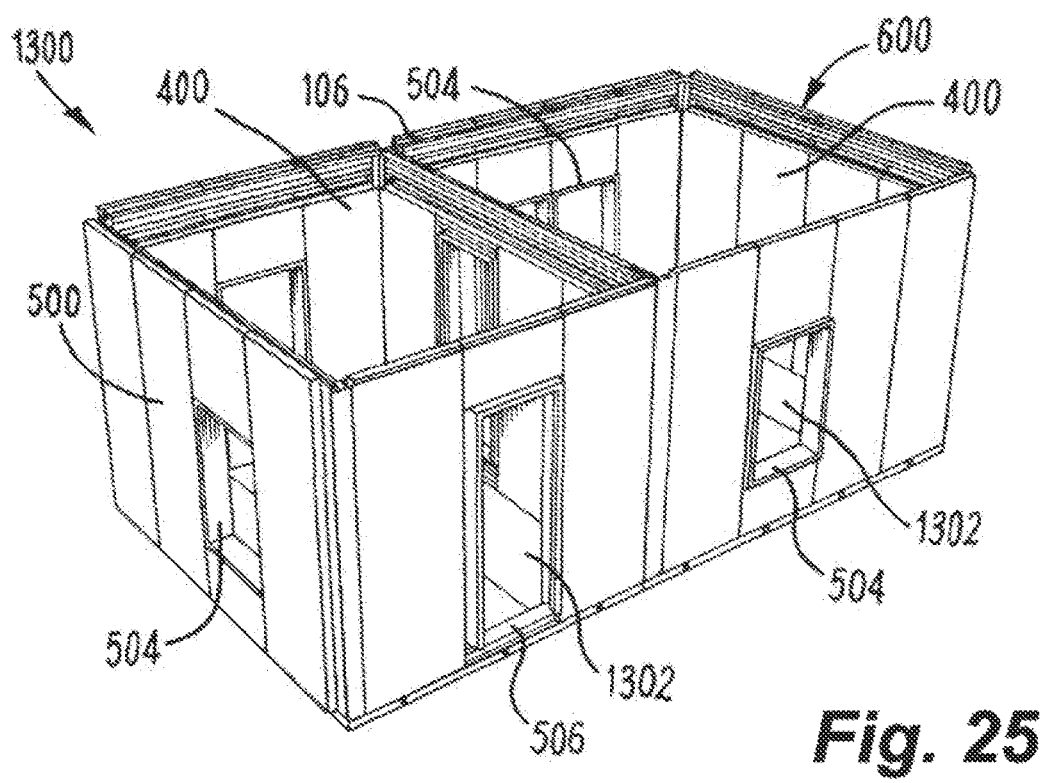
FIG. 25 is a perspective view of the partially completed modelling assembly of FIG. 24 receiving and holding a plurality of interior wall panels, a plurality of exterior façade panels, a plurality of window aperture frames and a plurality of door aperture frames and with floor pieces in situ.
Figure 26:
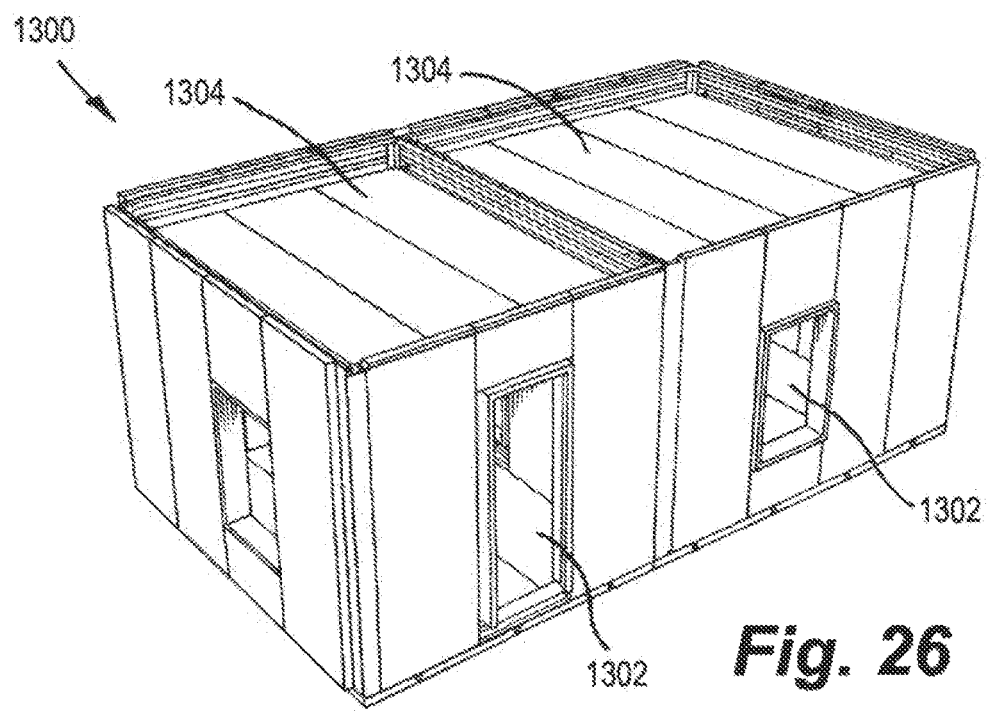
FIG. 26 is a perspective view of the partially completed modelling assembly of FIG. 25 with ceiling pieces in situ.
Figure 27:
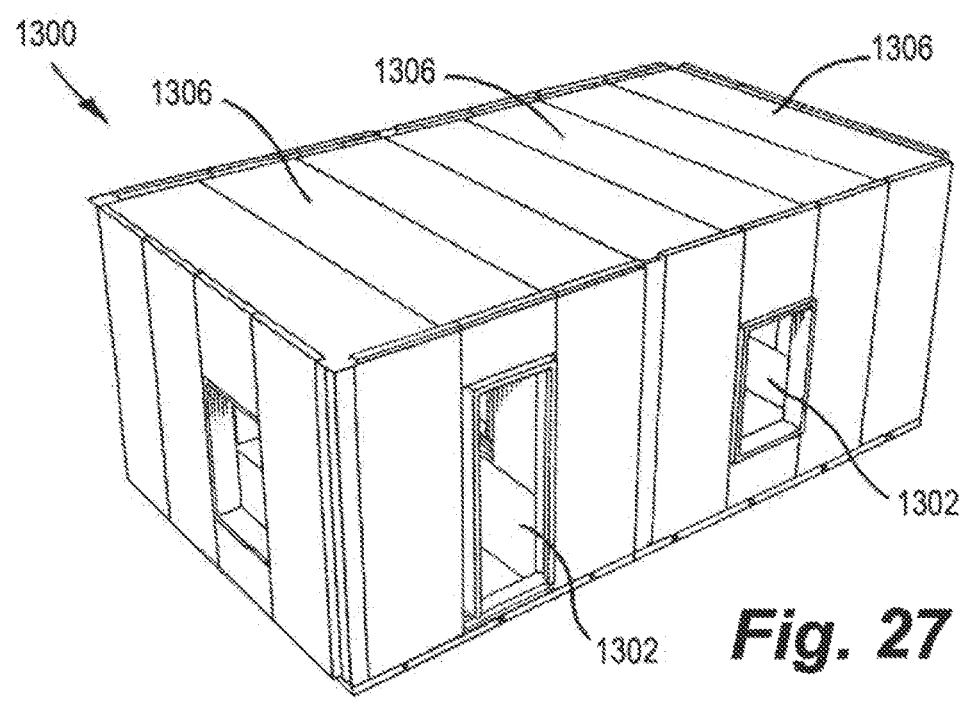
FIG. 27 is a perspective view of the partially completed modelling assembly of FIG. 26 with roof panels in situ forming a partially completed flat roof.
Figure 28:
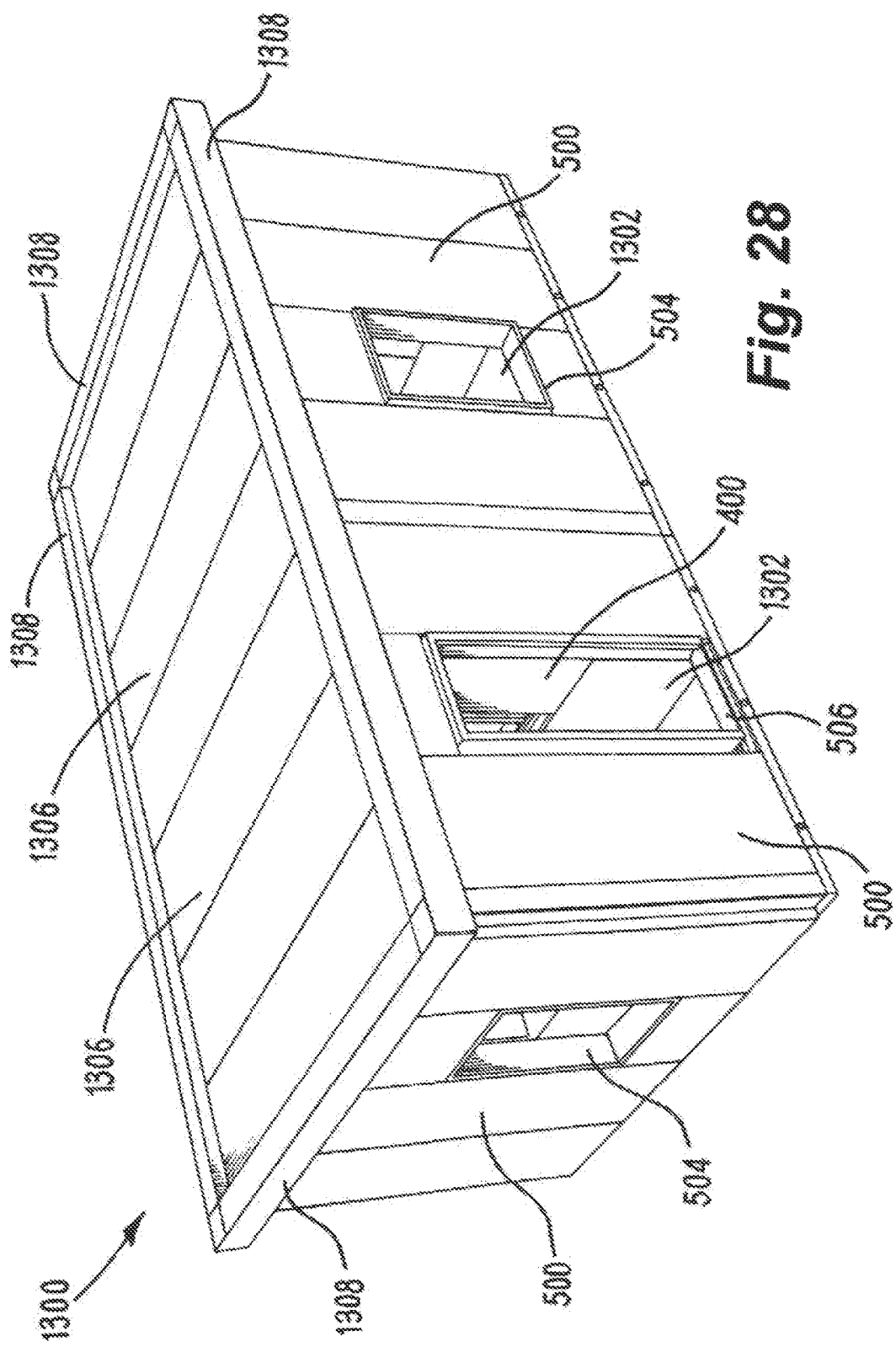
FIG. 28 is a perspective view of the modelling assembly of FIG. 27 with a completed flat roof.

With reference to FIGS. 24 to 28 inclusive, wherein like parts previously described have been assigned the same reference numerals, there is provided a pair of supporting structures 600 connected together with a retaining clip 900. The supporting structures 600 each receive and hold a plurality of interior wall panels 400, a plurality of exterior façade panels 500, a plurality of window aperture frames 504 and a plurality of door aperture frames 506. The window and door frames 504, 506 define window and door apertures 1302. As can be seen in FIG. 25 in particular, the height of the interior wall panels 400 is shorter than the height of the exterior façade panels 500. The height of the interior wall panels 400 is preferably less than a lowermost beam of the double upper cross beams.

The modelling assembly 1300 further receives ceiling pieces 1304 which preferably sit atop the interior wall panels

400 or alternatively may be connected and held in place using the supporting structure 600. Roof panels 1306 are placed over the ceiling pieces 1304 and finally capping bars 1308 are placed around the edge of the modelling assembly 1300 to give the modelling assembly a completed flat roof and a pleasing finish.

In a preferred embodiment, a portion of the roof may be constructed of a translucent or transparent material such as Perspex® to allow a viewer to look into the interior of the model from above. Skylights and the like may also be formed in the modelling assembly and other roof features such as a pitched roof with chimneys and the like may also be formed using different roofing panels and modelling assembly pieces (not shown).

It will be readily appreciated that a number of different connection means may be used to receive and hold interior wall panels 400 and the exterior façade panels 500 to the supporting structure 108. For example, connection means such as hook and loop type fasteners, pinching slots, compression fits, button fasteners, reusable adhesive based strips and the like could be used to receive and hold interior wall panels 400 and the exterior façade panels 500 to the supporting structure 108.

It will be understood that the concept of using a framework which allows an interior panel and an exterior facade to be mounted on the framework could be applied to a children's toy and/or children's game. For example, a children's toy such as a doll's house, doll's room or walk-in play house could be relatively easily constructed by enlarging the scale of the assembly to the required size. Furthermore, the principle can be applied to larger objects which do not form children's toys or models but could be for example a framework for product displays allowing double sided signage to be quickly mounted on the framework. As product cycles change, the signage could be quickly changed to reflect the new product cycle whilst the framework would not need to be altered. Furthermore, the same concept could also be applied to advertising boards and the like.

The invention also provides modelling assemblies which can be adapted for use by interior designers, theatre designers, stage designers, film or TV set designers, model makers, and students of these disciplines.

The advantage of providing a double sided modelling assembly which can replicate both exterior walls and interior walls using exterior façade panels and the interior wall panels is that the potential client will get a better understanding of how a building or room will look after refurbishment by having a view of both the outer cladding and the interior design scheme.

Advantageously, any cladding, design, surface or texture pattern may be taken from a digital image on a computer, camera or on the Internet and printed onto the exterior façade panels and the interior wall panels so that the panels can replicate that pattern on the model formed by the modelling assembly. Moreover, any image or photo such as a child's face or cartoon character, landscape or the like could be replicated on the exterior façade panels and the interior wall panels.

FIGS. 29 to 39 show other embodiments of the invention, many features of which are similar to those already described in relation to the embodiments of FIGS. 1 to 28. Therefore, for the sake of brevity, the following embodiments will only be described in so far as they differ from embodiments already described. Where features are the same or similar, the same reference numerals have been used and the features will not be described again.

FIGS. 29-35 show another modelling assembly 1400 including a plurality of releasably interconnectable parts including floor parts 1402, frame parts 1404, link parts 1406 and wall parts 1408. The assembly 1400 includes a plurality of pegs 102, each of which, in an assembled condition, extend from one part to another part to hold the parts together, at least one of the parts defining a peg receiving hole 104 in which one of the pegs is receivable.

In this embodiment, the pegs 102 are formed integrally with some of the parts, as will be described below.

The assembly 1400 includes a floor sub-assembly 1410, which includes a plurality of floor parts 1402, which, in the assembled condition are held together by the link parts 1406, which include integrally formed pegs 102.

The floor parts 1402 define floor part peg receiving holes 104A, which are through holes, and which in the assembled condition receive the link part pegs 102, and can receive the link part pegs 102 in use from above and/or below.

The assembly 1400 could include a plurality of different floor parts 1402. As shown in FIG. 29, the floor parts 1402 could be modular, based on a module 1402A which is square in plan. The module 1402A comprises an in use upper surface 1411. The module 1402A includes a receiving formation 1413 comprising a rim 1412, defining a recess 1414, the rim 1412 projecting upwardly from the upper surface 1411. The module 1402A further defines spaced pairs of the floor part peg receiving holes 104A, one pair of holes 104A being arranged along each side of the module 1402A.

As shown in FIG. 29, the floor parts 1402 could be in the form of strips, comprising one, two, three or more modules 1402A, wherein the modules 1402A are arranged in a line.

Each of the holes 104A is spaced from the nearest corner of the module 1402A by a distance of approximately 25% of the module length, so that each hole 104A is spaced by a distance of approximately 50% of the module length from the other hole of the same pair. This spacing means that the spacing of the holes 104A is consistent both within and between modules 1402A when modules 1402A and/or floor parts 1402 are located together.

Referring to FIG. 32A, each wall part 1408 includes integrally formed pegs 102, which are arranged in pairs. Each wall part includes a wall part side 1456, with a wall part end 1458 extending from each end of the side 1456. Each end 1458 is in the form of a flange which projects laterally from the side 1456. One pair of spaced pegs 102 projects from each end 1458. The ends 1458 are similar in form.

The pairs of wall part pegs 102 correspond to, and are receivable in the pairs of floor part peg receiving holes 104A. Each wall part 1408 is approximately the same width (ie the in use horizontal dimension) as the length of each side of the module 1402A.

The floor parts 1402 are locatable above the wall parts 1408 to form ceiling parts, wherein the wall part pegs 102 are receivable in the floor part peg receiving holes 104A from below. The pegs 102 and holes 104 could be arranged so that the pegs click into place in the holes, for example, each peg 102 could include an oversized head (not shown) which must be forced past a relatively narrow entry into one of the holes 104.

The wall parts 1408 could be formed of translucent or transparent material or could include transparent or translucent parts to form window wall parts 1408A.

The wall parts 1408 could include parts 1408B which have one edge 1416 which is chamfered to permit a 90° corner to be formed with a like wall part.

Referring to FIG. 32C, the assembly 1400 includes floor covering panels 1418, which correspond in plan size with the size and shape of the module 1402A. Each floor covering panel 1418 includes a retaining formation (not shown) which is receivable in the receiving formation 1413.

Referring to FIG. 32F, the assembly 1400 includes roof covering panels 1420, each of which may correspond in plan size with the size and shape of one module 1402A. Each roof covering panel 1420 includes pairs of spaced integral pegs 102 which correspond with the floor part peg receiving holes 104A. Alternatively, each roof covering panel could include a retaining formation (not shown) which is receivable in the receiving formation 1413.

In use, to assemble the assembly 1400, referring to FIGS. 30 and 31, link parts 1406 are used to join floor parts 1402 together to form a floor sub-assembly 1410 of the desired shape. The link parts 1406 can be fitted to the top and/or the underside of the floor parts 1402. Fitting to the underside frees space on the upper face for other components. The consistent spacing of the holes 104A across floor parts 1402 means that the link parts 1406 can be used in a variety of orientations.

The size of the module 1402A could correspond to a convenient actual size, for example, the square module 1402A could represent a 1000 mm×1000 mm floor part in actual size. The scale could be any convenient scale. For example, the scale could be 1:25, so that the square module 1402A representing a 1000 mm×1000 mm floor part is 40 mm×40 mm in actual size.

In another example, the scale could be 1:48 and the square module 1402A representing a 1200 mm×1200 mm floor part is 25 mm×25 mm in actual size.

FIGS. 32A to 32G show further steps in the construction of the modelling assembly 1400. When the floor sub-assembly 1410 has been formed, wall parts 1408 are located on the floor sub-assembly 1410 as desired to form external walls as shown in FIGS. 32A and B. Chamfered wall parts 1408B can be used at corners. Transparent wall parts 1408A could be used where window or door apertures are located. Chamfered transparent wall parts 1408C could be used at corners. The wall parts 1408 are the same at each end, so can be used with either end up, so that only one chamfered wall part of each type is required.

As shown in FIG. 32C, wall parts 1408 are located on the floor subassembly 1410 as desired to form internal walls. The assembly 1400 could include an abutting wall part 1408D for abutting against one of the wall parts 1408 forming one of the external walls, which is slightly shorter in length to accommodate the external wall.

With the internal walls in position, floor covering panels 1418 are located to the floor subassembly 1410 to create a floor covering.

As shown in FIG. 32D, a second floor subassembly 1410A which is the same as the floor subassembly 1410 can be located on top of the wall parts 1408 to form a ceiling or roof.

As shown in FIG. 32E, further wall parts 1408 can be located on to the second floor subassembly 1410A to form a second layer (i.e. a first floor layer) 1422, and a third floor subassembly 1410B can then be located on top of the wall parts 1408 of the second layer 1422. This process can continue until the modelling assembly 1400 has the desired number of layers. Thus, each layer comprises an upper and lower floor sub-assembly 1410, wherein the lower floor sub-assembly of a higher layer forms the upper floor sub-assembly of an adjacent lower layer.

When the desired number of layers has been formed, flat roof cover panels 1420 can be located on to the uppermost floor subassembly 1410. The assembly 1400 could include side edge roof cover panels 1420A having a raised rim feature 1424 along one side and corner edge roof cover panels 1420B having a raised rim feature 1424 along two sides.

The assembly 1400 includes internal and external wall, roof and floor coverings 1426, which are mounted to internal and external surfaces of the wall parts 1408, the roof covering panels 1420 and the floor covering panels 1418. The coverings 1426 could be patterned and/or textured as required to suit the appearance desired. The coverings 1426 could be fixed in any suitable way, for example, by permanent or repositionable adhesive, magnetic attraction, and/or hook and loop fasteners. The coverings could be provided to the user with pre-applied adhesive, or the user could apply the adhesive. Where transparent wall parts 1408A have been used, these could be partially covered by the coverings 1426 to permit window or door openings of a variety of sizes to be represented.

The assembly 1400 could include a wide variety of accessory parts to permit other features to be formed. For example, the accessory parts could include different shaped floor parts, door frame parts with opening hinged doors, balcony panels (or half height wall parts), columns, stairs, roof parts etc.

FIGS. 33 and 34 show accessory parts in the form of spacer parts 1428 which can be used between layers when an internal double height space is required. The spacer parts 1428 could include an edge spacer part 1428A and a corner spacer part 1428B, both defining pairs of peg receiving holes 104 which correspond with the spacing of the pegs 102 of the wall parts 1408.

As shown in FIGS. 35A to D, the assembly 1400 could include a pitched roof sub-assembly 1430. The pitched roof sub-assembly 1430 includes a truss sub-assembly 1432, which includes a plurality of truss parts 1434. Each of the truss parts 1434 is in the form of a parallelogram, having a pair of parallel upper and lower sides and a pair of angled sides, one of the angled sides forming an outwardly facing angled surface 1436 in the assembled condition. Each truss part 1434 includes a peg 102 projecting from a lower face, and a peg receiving hole 104 defined in an upper face, and includes either pegs 102 or peg receiving holes 104 formed on the lateral sides and the outwardly facing angled surface 1436.

The truss sub-assembly 1432 includes a triangular shaped truss apex part 1438. The truss apex part 1438 includes pegs 102 projecting from a lower face, and includes either pegs 102 or peg receiving holes 104 formed on the lateral sides and an outwardly facing angled surface 1436.

The pitched roof sub-assembly 1430 includes a pair of spaced truss sub-assemblies 1432, and includes span members 1440, which are located to extend between the truss sub-assemblies 1432. The span members 1440 include either pegs 102 or peg receiving holes 104 which, in the assembled condition, engage the pegs or holes formed on the outwardly facing angled surfaces 1436 of the truss parts 1434 and the truss apex parts 1438.

The pitched roof sub-assembly 1430 includes gable end parts 1442, which include either pegs 102 or peg receiving holes 104 for mounting the gable end parts 1442 to the side of one of the truss sub-assemblies 1432.

In use, to assemble the pitched roof sub-assembly 1430, an appropriate combination of truss apex part 1438 and truss parts 1436 is chosen to match the dimension of the floor subassembly 1410 on which the pitched roof sub-assembly 1430 is to be mounted. In this respect, the truss parts 1430 are of a length such that one truss part 1430 extends the span of the truss sub-assembly 1432 by one half module length, ie the distance between the floor part peg receiving holes 104A.

For a relatively short span roof, it may only be necessary to use the truss apex part 1438 to form the truss sub-assembly 1432. For longer span roofs, the truss parts 1434 are used to extend the span of the truss sub-assembly 1432. A pair of spaced truss parts 1430 are located on the floor sub-assembly 1410, the downwardly projecting pegs 102 of the truss parts 1434 being received in the floor part peg receiving holes 104A. Further truss parts 1434 are located to build up the height of the truss sub-assembly 1432, and finally the truss apex part 1438 is located on top of the two sets of truss parts 1434 to form the truss sub-assembly 1432.

Span members 1440 are located between pairs of truss sub-assemblies 1432. Gable end parts 1442 are mounted to outwardly facing transverse sides of the truss sub-assemblies 1432 to form the pitched roof sub-assembly 1430 as shown in FIG. 35C, and finally coverings 1426 can be applied to the gable ends and sloping roofs of the pitched roof sub-assembly 1430 to provide a realistic visual simulation of an envisaged building.

The truss sub-assemblies 1432 could be provided with different pitch angles, so that the pitched roof sub-assembly 1430 provides a roof which has a different pitch angle.

FIG. 35E shows another pitched roof sub-assembly 1450 in construction. In this embodiment, the pitched roof sub-assembly 1450 includes a plurality of pairs of truss sub-assemblies 1432, which are sequentially arranged ready to support span members 1440. The pitched roof sub-assembly 1450 includes ridge parts 1454 for capping the roof, and a single piece dormer unit 1452, which is mounted to one of the pairs of truss sub-assemblies 1432. Both the ridge parts 1454 and the dormer unit 1452 include either pegs 102 or peg receiving holes 104 which, in an assembled condition, engage the pegs or holes formed on the outwardly facing angled surfaces 1436 of the truss parts 1434 and/or the truss apex parts 1438.

In the example shown, the dormer unit 1452 is one module wide, and extends upwardly by two truss parts 1434. In other examples, the dormer unit could be a different size, and could, for example be more than one module wide. The dormer unit 1452 could be formed of a transparent or translucent material so that when coverings 1426 are applied, a window can be formed, by leaving some of the dormer unit 1452 uncovered by the coverings 1426.

The assembly 1400 could include ridge parts which could include straight and intersecting ridge parts, such as T-intersection ridge parts or cross intersection ridge parts.

The assembly 1400 could include a plurality of pitched roof sub-assemblies 1430, which could be of different sizes and designs, and could be arranged to form roofs which are, for example, L-shaped, T-shaped, or U-shaped in plan, with intersections between the pitched roof sub-assemblies. Accessory parts could be provided which are shaped to accommodate the angles of the intersecting roofs such as differently shaped span members (not shown), which include one or more obliquely angled sides.

FIGS. 35G to I show an example of a multiple pitched roof sub assembly 1460 which comprises a plurality of pitched roof sub-assemblies 1430 of different sizes and designs. FIG. 35F shows some of the parts used in constructing the multiple pitched roof sub assembly 1460, including span members 1440 of different lengths and widths, angled span members 1444 having one or more obliquely angled sides for accommodating an intersecting pitched roof sub assembly 1460 and gable end parts 1442 as previously described.

The process of forming the multiple pitched roof sub assembly 1460 is similar in many respects to that described previously for the pitched roof sub assembly 1430. Referring to FIG. 35G, a floor sub assembly 1410 of appropriate size and shape is formed, and a plurality of truss sub-assemblies 1432 of appropriate sizes and shapes are located on the floor sub assembly 1410. Span members 1440, gable end parts 1442 and angled span members 1444 are located on the truss sub-assemblies 1432 as shown in FIG. 35H. Finally, as shown in FIG. 35I, coverings 1426 can be applied to the gable ends and sloping roofs of the pitched roof sub-assembly 1460 to provide a realistic visual simulation of an envisaged building.

Referring to FIG. 35F, span members 1440A of transparent or translucent material could be provided to permit the representation of roof lights or skylights.

FIGS. 36A to 36G show another embodiment of the invention. These figures show modelling assembly 1500 which comprises a floor part in the form of a base slab 100 which defines a plurality of spaced peg receiving holes 102 around the edges thereof. The assembly 1500 includes frame parts 106 which are in the form of a rectangular frame 1502 defining a frame aperture 1504, the frame 1502 including in use substantially vertical side parts 1506, an in use horizontal upper part 1508 and an in use horizontal lower part 1510.

The frame parts 106 include mountings 203 for mounting wall parts 400, 500 to the frame parts, each mounting 203 comprising a magnetic member 208 in the form of a strip which is located in a recess 204 defined by the frame part 106.

The frame parts 106 include spaced pegs 102 which project upwardly from the upper part 1508 and downwardly from the lower part 1510.

One side part 1506 includes a connection formation 1512A which is engageable in the assembled condition with a complementary connection formation 1512B of the other side part 1506 of an adjacent frame part 106, each connection formation 1512 comprising alternate recesses 1514 and projections 1516. Some of the projections 1516 could include a lug projecting from each end thereof, while other of the projections 1516 define lug receiving holes in an end thereof, to provide a snap fit connection between adjacent side parts 1506.

Figure 36A:
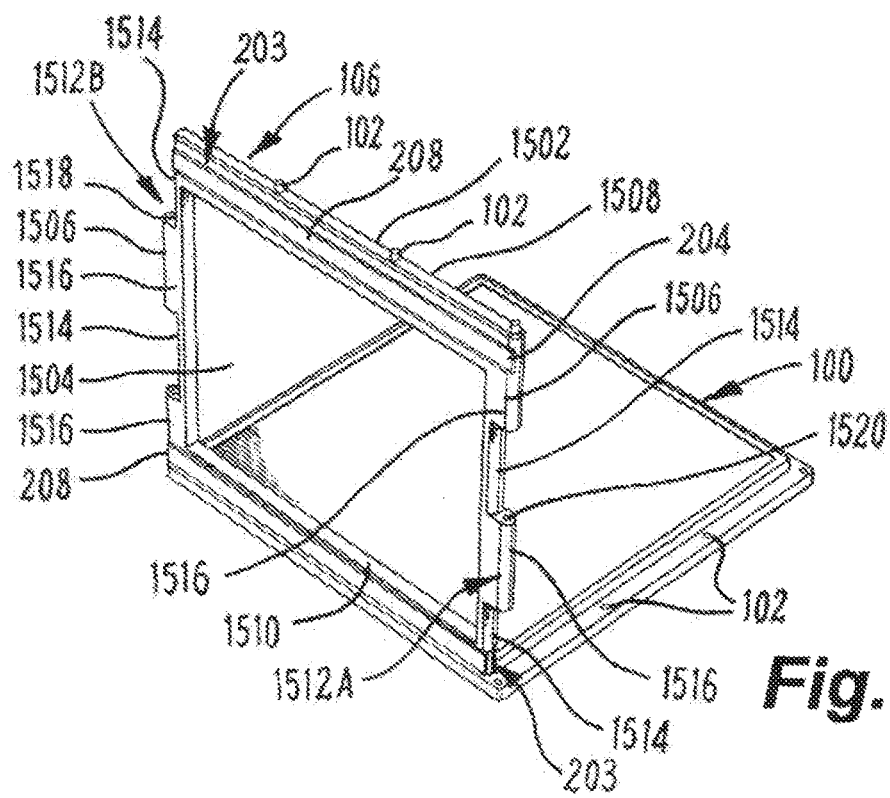

In use, the assembly 1500 is assembled as follows. As shown in FIG. 36A, frame parts 106 are located on the base slab 100 so that the downwardly projecting pegs 102 of the frame parts 106 are received in the peg receiving holes 102 of the base slab 100.

Figure 36B:
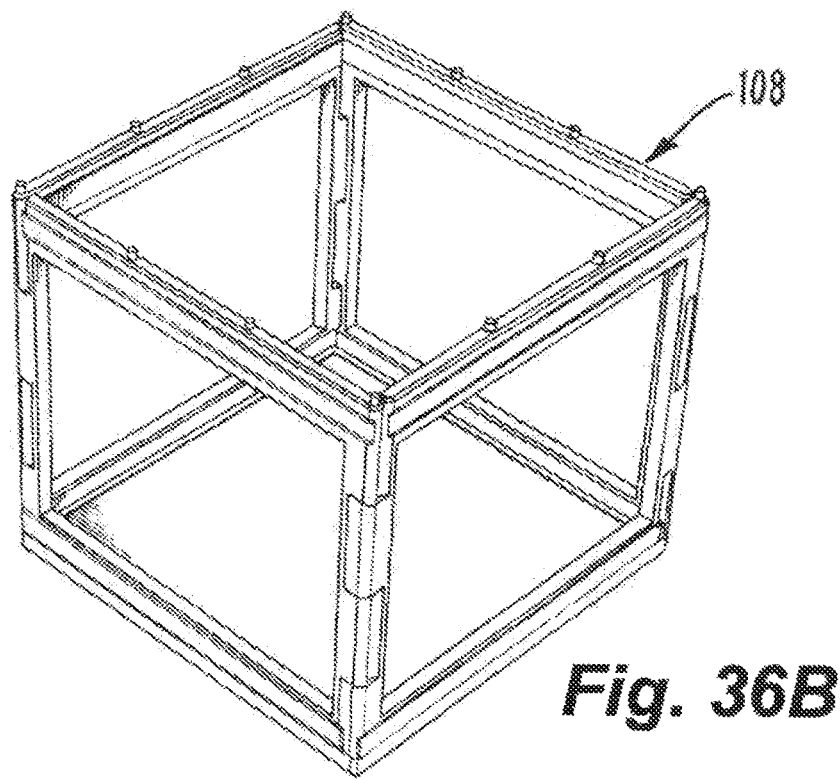

FIG. 36B shows several frame parts 106 connected together to form a structure 108.

Figure 36C:
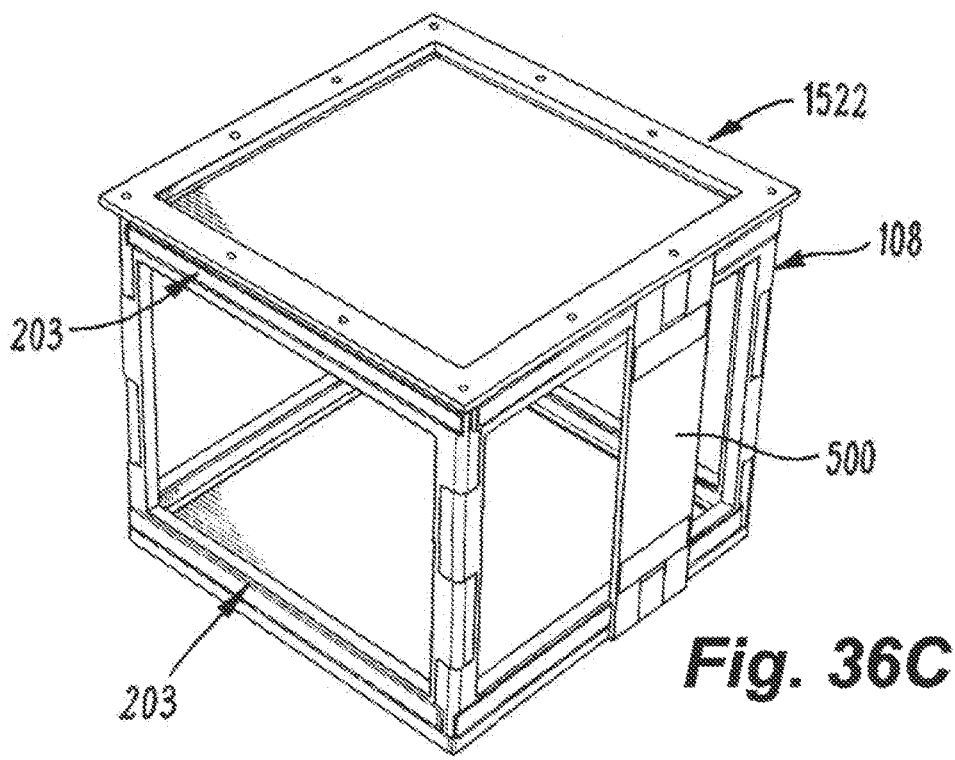

As shown in FIG. 36C, the assembly includes a roof part 1522 which is located on to the structure 108. The roof part 1522 could define spaced peg receiving holes 102 around the edges thereof. Alternatively or additionally, the roof part 1522 could be retained in position by magnetic attraction.

The assembly 1500 includes external wall parts 500 which can be retained in position on the structure by the mountings 203.

Figure 36D:
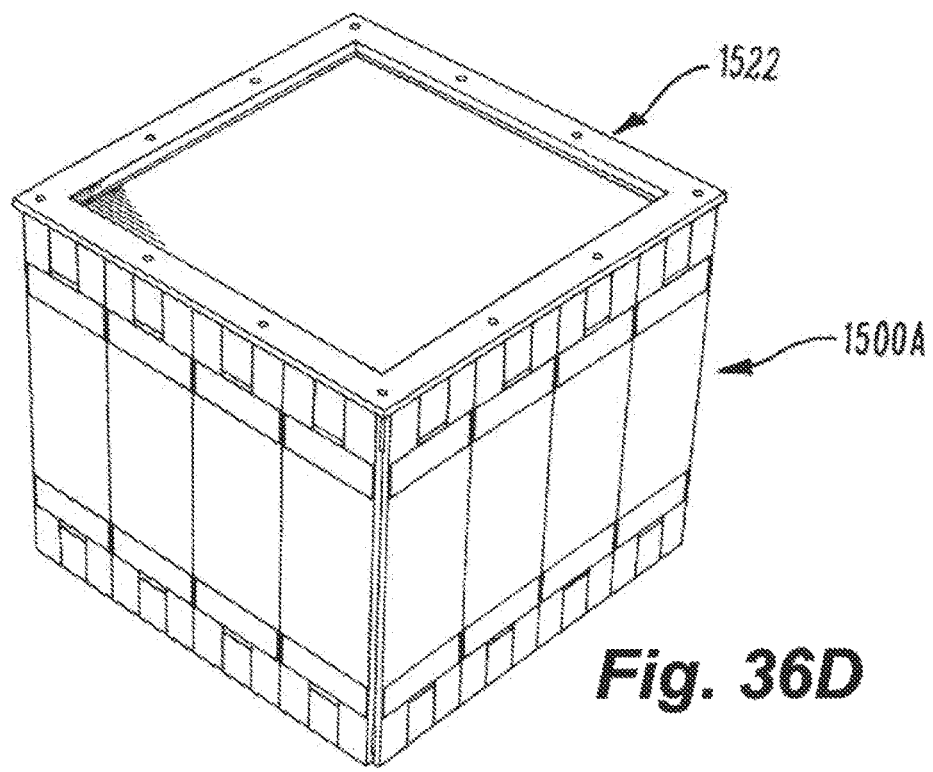

FIG. 36D shows an assembly 1500A in which the assembly includes the structure 108, the base slab 102, the roof part 1522 and the wall parts 500.

Figure 36E:
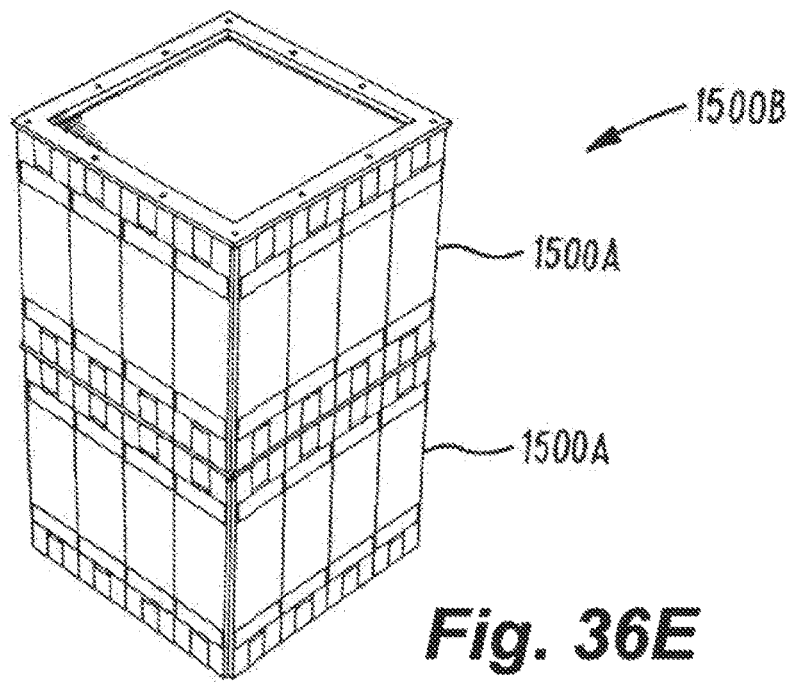

FIG. 36E shows an assembly 1500B which comprises a pair of single story assemblies 1500A, one on top of the other to form a double height assembly. The assemblies 1500A could be held together by magnetic attraction.

Figure 36F:
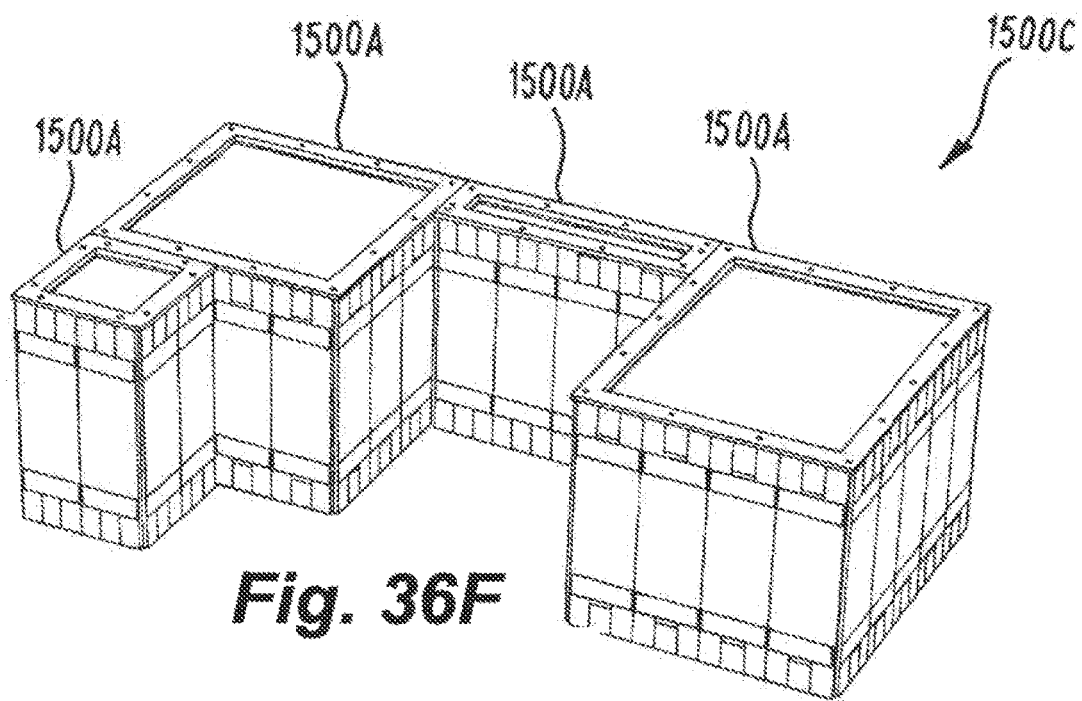

FIG. 36F shows an assembly 1500C comprising a plurality of different sized assemblies 1500A which could be held together by magnetic attraction.

Figure 36G:
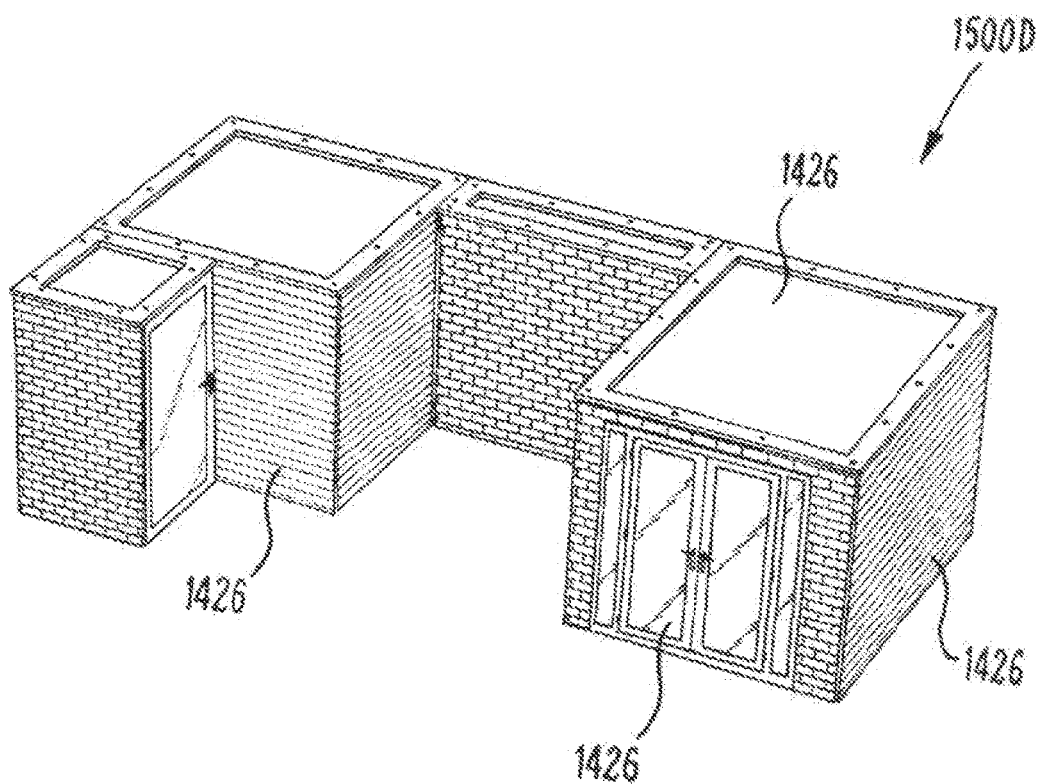

FIG. 36G shows an assembly 1500D in which coverings 1426 have been applied to the external surfaces to provide a visually realistic simulation of an envisaged building.

FIGS. 37 to 39 show still yet another embodiment which is similar to that shown in FIGS. 29 to 35. In this embodiment, a modelling assembly 1600 includes a floor part module 1602A which is substantially square in plan, having a substantially planar upper surface 1611 in which a receiving formation 1413 in the form of a central recess 1614 is defined. As with the floor part module 1402A, the module 1602A defines a plurality of peg receiving through holes 104A arranged in pairs along each side of the module 1602A. The floor part module 1402A includes an in use downwardly extending central projection 1612 which in the example shown is hollow, but in other examples could be solid. The projection 1612 is arranged to be receivable in use within the upper surface recess 1614 of an abutting floor part 1602. In one example, the fit of the projection 1612 in the upper surface recess 1614 could be a tight but sliding fit. When thus assembled, the abutting floor parts 1602 abut along their visible edges, providing a neat appearance.

Advantageously, in comparison with the floor part module 1402A, the floor part module 1602A provides a greater proportion of continuous flat surface to which a covering 1426 can be applied directly, rather than requiring the use of floor covering panels 1418. However, floor covering panels can still be provided, each having an in use downwardly extending projection 1612, and these panels could also be utilised as roof covering panels.

As shown in FIGS. 38 and 39, in this embodiment, this assembly 1600 includes pegs 102' which are different to the pegs 102 previously described. Each peg 102' defines a slot 1672 dividing the peg 102' into two peg parts 1670. The slot 1672 permits the peg parts 1670 to resiliently move towards each other when assembled into the peg receiving holes 104. The compression of the peg 102' serves to grip within the holes 104 so that the assembled components hold together better. The pegs 102' could be formed wherever the pegs 102 of the previous embodiments were utilized, eg on the link parts 1406, the wall parts 1408 and the various other component parts previously described as having pegs 102.

The modelling assembly 1600 could include any of the parts previously described (mutatis mutandis) and be assembled in a similar fashion to that previously described.

Various other modifications could be made without departing from the scope of the invention. The modelling assemblies of the invention could include parts of any suitable number, size or shape, formed of any suitable material. For example, the parts could be formed of plastics material, paper, card, metal, or wood.

Window and/door openings could be formed with transparent or translucent material, or could be formed by a gap, aperture or opening in material.

The parts of the assembly could be provided pre-printed with a decorative or textured appearance.

The assemblies of the invention could be provided in the form of a kit of parts, which could for example, include a number of different sized floor parts, differently angled truss parts etc., from which the user selects the most appropriate combination of parts.

The coverings could be supplied to the user pre-printed, or could have a pattern or decoration which is applied by the user, and which could be provided by the end user. The pattern, design or decoration could be downloaded from a library of patterns, designs or decorations via the internet.

The modelling assemblies of the invention could be provided in the form of three dimensional virtual entities in a computer program such as a computer aided design (CAD) system. The system could be arranged to permit representations of parts to be built up into assemblies. The system could also be arranged to convert a desired building design into a modelling assembly and provide a parts list of the parts required. The system could be linked to a 3D printer to generate physical parts specific to the design.

Any of the features or steps of any of the embodiments shown or described could be combined in any suitable way, within the scope of the overall disclosure of this document. For example, the mountings 203 could include pegs 102 which are receivable within holes 104 defined by the wall parts 400, 500 or the structure 108.

There is thus provided a modelling assembly which permits the user to rapidly construct an accurate architectural model. The assembly can be easily disassembled so that the parts can be reused. The invention thus reduces the time and expense incurred in providing architectural models, enabling clients, building users and other interested parties to be more easily given an impression of the building envisaged.

The invention claimed is:

1. A modelling assembly comprising:
    a plurality of releasably interconnectable parts including floor parts and wall parts;
    a plurality of pegs, each of which, in an assembled condition, extends from one part to another part to hold the parts together;
    at least one of the parts defining a peg receiving hole in which one of the pegs is receivable, the pegs being formed integrally with one or some of the parts; and
    a floor sub-assembly including a plurality of the floor parts, the floor parts defining floor part peg receiving holes, the floor sub-assembly further including link parts, wherein, in the assembled condition, the floor parts are held together by the link parts, the link parts including integrally formed pegs, which are receivable in the floor part peg receiving holes, in which the holes are through holes so that the pegs are receivable in one end of the hole or the other and the floor part peg receiving holes receive the link part pegs in use from above and/or below.

2. The assembly according to claim 1, in which the assembly includes a plurality of different floor parts, which are modular.

3. The assembly according to claim 1, in which the floor parts are based on a module which is square in plan.

4. The assembly according to claim 1, in which each module comprises spaced pairs of floor part peg receiving holes, one pair of holes being arranged along each side of the module, the holes being provided at a spacing of one half module length between the holes of a pair, with each hole spaced a quarter module length from the nearest module corner.

5. The assembly according to claim 1, in which each wall part includes integrally formed pegs, one or more pegs of which project from each end of the wall part, which ends are similar in form.

6. An assembly according to claim 1, in which each wall part includes integrally formed pegs which are arranged in spaced pairs, and the wall part pegs correspond to, and are receivable in the floor part peg receiving holes.

7. An assembly according to claim 1, in which the wall parts are substantially the same width as the length of each side of the module.

8. An assembly according to claim 1, in which the wall parts include parts which have one edge which is chamfered to permit the formation of angles or corners.

9. An assembly according to claim 1, in which the assembly comprises a plurality of layers, which are arranged one on top of the other, each layer comprising an upper and lower floor sub-assembly, wherein the lower floor sub-assembly of a higher layer forms the upper floor sub-assembly of an adjacent lower layer.

10. An assembly according to claim 1, in which the assembly comprises a plurality of layers, which are arranged one on top of the other, each layer comprising an upper and lower floor sub-assembly, wherein the lower floor sub-assembly of a higher layer forms the upper floor sub-assembly of an adjacent lower layer, the assembly including roof covering panels for locating on the uppermost upper floor sub-assembly, each of which corresponds in plan size with the size and shape of one module, and includes integral pegs which correspond with the floor part peg receiving holes.

11. An assembly according to claim 1, in which the assembly includes internal and external wall coverings, which are mounted respectively to internal and external surfaces of at least some of the parts.

12. An assembly according to claim 1, in which the assembly is an architectural model.

13. An assembly according to claim 1, in which the assembly and the parts thereof are provided in the form of virtual entities in a computer program.

14. A method of forming a modelling assembly, the method comprising the step of providing a modelling assembly, the assembly including a plurality of releasably interconnectable parts, the parts including floor parts and wall parts, the assembly including a plurality of pegs, each of which, in an assembled condition, extends from one part to another part to hold the parts together, at least one of the parts defining a peg receiving hole in which one of the pegs is receivable, the pegs being formed integrally with one or some of the parts, the assembly including a floor sub-assembly, the floor sub-assembly including a plurality of the floor parts, the floor parts defining floor part peg receiving holes, the floor sub-assembly including link parts, wherein, in the assembled condition, the floor parts are held together by the link parts, the link parts including integrally formed pegs, which are receivable in the floor part peg receiving holes, in which the holes are through holes so that the pegs are receivable in one end of the hole or the other and the floor part peg receiving holes receive the link part pegs in use from above and/or below.

15. A kit of parts for a modelling assembly, the kit including a plurality of releasably interconnectable parts including floor parts and wall parts, the kit including a plurality of pegs, each of which, in an assembled condition, extends from one part to another part to hold the parts together, at least one of the parts defining a peg receiving hole in which one of the pegs is receivable, the pegs being formed integrally with one or some of the parts, the floor parts defining floor part peg receiving holes, the kit including link parts, the link parts including integrally formed pegs, which are receivable in the floor part peg receiving holes, wherein, in the assembled condition, the floor parts are held together by the link parts to form a floor sub-assembly, in which the holes are through holes so that the pegs are receivable in one end of the hole or the other and the floor part peg receiving holes receive the link part pegs in use from above and/or below.

* * * * *